US012752780B2

(12) United States Patent
Gupta et al.

(10) Patent No.: US 12,752,780 B2
(45) Date of Patent: Oct. 6, 2026

(54) PERSONALIZED ADAPTIVE CRUISE CONTROL (P-ACC) BASED ON IN-CABIN DATA

(71) Applicant: TOYOTA MOTOR ENGINEERING & MANUFACTURING NORTH AMERICA, INC., Plano, TX (US)

(72) Inventors: Rohit Gupta, Santa Clara, CA (US); Ziran Wang, San Jose, CA (US); Kyungtae Han, Palo Alto, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 598 days.

(21) Appl. No.: 17/872,469

(22) Filed: Jul. 25, 2022

(65) Prior Publication Data

US 2024/0025404 A1 Jan. 25, 2024

(51) Int. Cl.

| | |
|---|---|
| ***B60W 30/14*** | (2006.01) |
| ***B60W 30/165*** | (2020.01) |
| ***B60W 40/02*** | (2006.01) |
| ***B60W 40/08*** | (2012.01) |
| ***B60W 50/00*** | (2006.01) |
| ***B60W 50/10*** | (2012.01) |
| ***G06N 20/00*** | (2019.01) |

(52) U.S. Cl.

CPC ........ *B60W 30/143* (2013.01); *B60W 30/165* (2013.01); *B60W 40/02* (2013.01); *B60W 40/08* (2013.01); *B60W 50/10* (2013.01); *G06N 20/00* (2019.01); *B60W 30/14* (2013.01); *B60W 2050/0005* (2013.01); *B60W 2050/0088* (2013.01); *B60W 2540/043* (2020.02); *B60W 2540/049* (2020.02); *B60W 2556/10* (2020.02); *B60W 2754/30* (2020.02)

(58) Field of Classification Search

None

See application file for complete search history.

(56) References Cited

U.S. PATENT DOCUMENTS 8,509,987 B2 8/2013 Resner
8,612,107 B2 12/2013 Malikopoulos
(Continued)

FOREIGN PATENT DOCUMENTS

EP 3357780 A1 8/2018

OTHER PUBLICATIONS

Co-pending U.S. Appl. No. 17/578,330 to Zhao et al., "Personalized Adaptive Cruise Control based on Steady-State Operation," filed Jan. 2022.
(Continued)

*Primary Examiner* — James J Lee
*Assistant Examiner* — Tawri M McAndrews
(74) *Attorney, Agent, or Firm* — SHEPPARD, MULLIN, RICHTER & HAMPTON LLP; Daniel N. Yannuzzi

(57) ABSTRACT

The disclosure generally includes systems and methods of generating a preferred personalized adaptive cruise control (P-ACC) mode of operation. The method includes capturing vehicle data using one or more internal and external vehicle sensors, and adjusting one or more P-ACC mode of operation parameters, based on captured vehicle data, before operation of the P-ACC mode of operation. Vehicle data includes internal vehicle data comprising a type of passenger and number of passengers in the vehicle.

7 Claims, 12 Drawing Sheets

(56) References Cited

U.S. PATENT DOCUMENTS

| | | | | |
|---|---|---|---|---|
| 9,399,465 | B2 | 7/2016 | Slaton | |
| 10,286,915 | B2 | 5/2019 | Xiao | |
| 2015/0203108 | A1* | 7/2015 | Loria | B60W 50/0098 701/1 |
| 2018/0043891 | A1* | 2/2018 | Pilutti | B60W 30/143 |
| 2018/0265085 | A1* | 9/2018 | Mallinger | B60W 30/143 |
| 2020/0269857 | A1* | 8/2020 | Tsuji | B60W 40/08 |
| 2023/0049927 | A1* | 2/2023 | Engel | B60W 60/005 |
| 2023/0398988 | A1* | 12/2023 | Barrett | B60W 40/09 |

OTHER PUBLICATIONS

Wang et al., "Personalized Adaptive Cruise Control via Gaussian Process Regression," 2021 IEEE Intelligent Transportation Systems Conference (ITSC), Sep. 2021, pp. 1496-1502 (https://doi.org/10.1109/ITSC48978.2021.9564498).

Co-pending U.S. Appl. No. 17/572,486 to Zhao et al., "Personalized Vehicle Operation for Autonomous Driving with Inverse Reinforcement Learning", filed Jan. 2022.

Ozkan et al., "Personalized Adaptive Cruise Control and Impacts on Mixed Traffic," American Control Conference (ACC), Mar. 26, 2021, 6 pages (https://arxiv.org/abs/2103.14705).

Yi et al., "Implicit Personalization in Driving Assistance: State-of-the-Art and Open Issues," IEEE Transactions on Intelligent Vehicles, 5(3):397-413, Dec. 19, 2019 (https://doi.org/10.1109/TIV.2019.2960935).

Bolduc et al., "Multimodel Approach to Personalized Autonomous Adaptive Cruise Control," IEEE Transactions on Intelligent Vehicles, 4(2):321-330.

* cited by examiner

PERSONALIZED ADAPTIVE CRUISE CONTROL (P-ACC) BASED ON IN-CABIN DATA

TECHNICAL FIELD

The disclosed technology relates generally to personalized adaptive cruise control (P-ACC) functionality in a vehicle, and more particularly, in some embodiments, to adjusting P-ACC functionality in a vehicle based on a preferred mode of P-ACC operation.

DESCRIPTION OF RELATED ART

Adaptive cruise control systems are driver-assistance systems for road vehicles that automatically adjust a vehicle speed to maintain a certain following distance from a lead vehicle ahead. In particular, adaptive cruise control systems may utilize various sensing technologies such as radar, laser, and the like to detect a lead vehicle and adjust a following vehicle's speed as necessary to maintain a certain following distance. In some adaptive cruise control systems, the following distance may be one of several preset following distances manually selected by a driver. Thus, for a driver to adjust the following distance, the driver must manually adjust the following distance of the vehicle by operating a preceding vehicle mark button to increase or decrease the following distance.

BRIEF SUMMARY OF THE DISCLOSURE

In one embodiment, the techniques described herein relate to a vehicle control system, comprising: a preferred personalized adaptive cruise control (P-ACC) circuit including: at least one memory storing machine-executable instructions; and at least one processor configured to access the at least one memory and execute the machine-executable instructions: capture vehicle data using one or more vehicle sensors, wherein captured vehicle data includes internal vehicle data and external vehicle data, wherein the internal vehicle data includes in-cabin vehicle data captured before operation of the P-ACC; and adjust one or more P-ACC mode of operation parameters based on captured vehicle data, before operation of the P-ACC, wherein adjusting one or more P-ACC mode of operation generates a preferred P-ACC mode of operation.

In one embodiment, the techniques described herein relate to a method for generating a preferred personalized adaptive cruise control (ACC) system of a vehicle, the method including: activating a preferred P-ACC mode of operation of the vehicle, wherein activating the preferred P-ACC mode of operation includes adjusting one or more parameters of a P-ACC mode of operation, wherein one or more parameters of a P-ACC mode of operation are adjusted based on vehicle data, and wherein the vehicle data includes in-vehicle data including a type of passenger, and number of passengers in the vehicle, and external vehicle data including weather conditions and traffic conditions; monitoring for a manual intervention, wherein the manual intervention includes adjusting one or more preferred P-ACC mode of operation parameters by manually intervening with the preferred P-ACC mode of operation; storing vehicle dynamics data captured during the manual intervention; and training a machine learning model using the vehicle data to adjust the preferred P-ACC mode of operation in one or more vehicles based on the manual intervention.

In one embodiment, the techniques described herein relate to a method for generating a preferred personalized adaptive cruise control (ACC) mode of operation of a vehicle, the method including: adjusting one or more P-ACC operation parameters based on the preferred P-ACC mode of operation, wherein the preferred P-ACC mode of operation is activated by a driver of the vehicle, and wherein the preferred P-ACC mode of operation includes one or more preferred P-ACC mode of operation settings; monitoring for a manual intervention, wherein the manual intervention includes adjusting one or more preferred P-ACC mode of operation parameters; storing vehicle dynamics data captured during the manual intervention; and training a machine learning model using the vehicle data to adjust the preferred P-ACC mode of operation in one or more vehicles.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
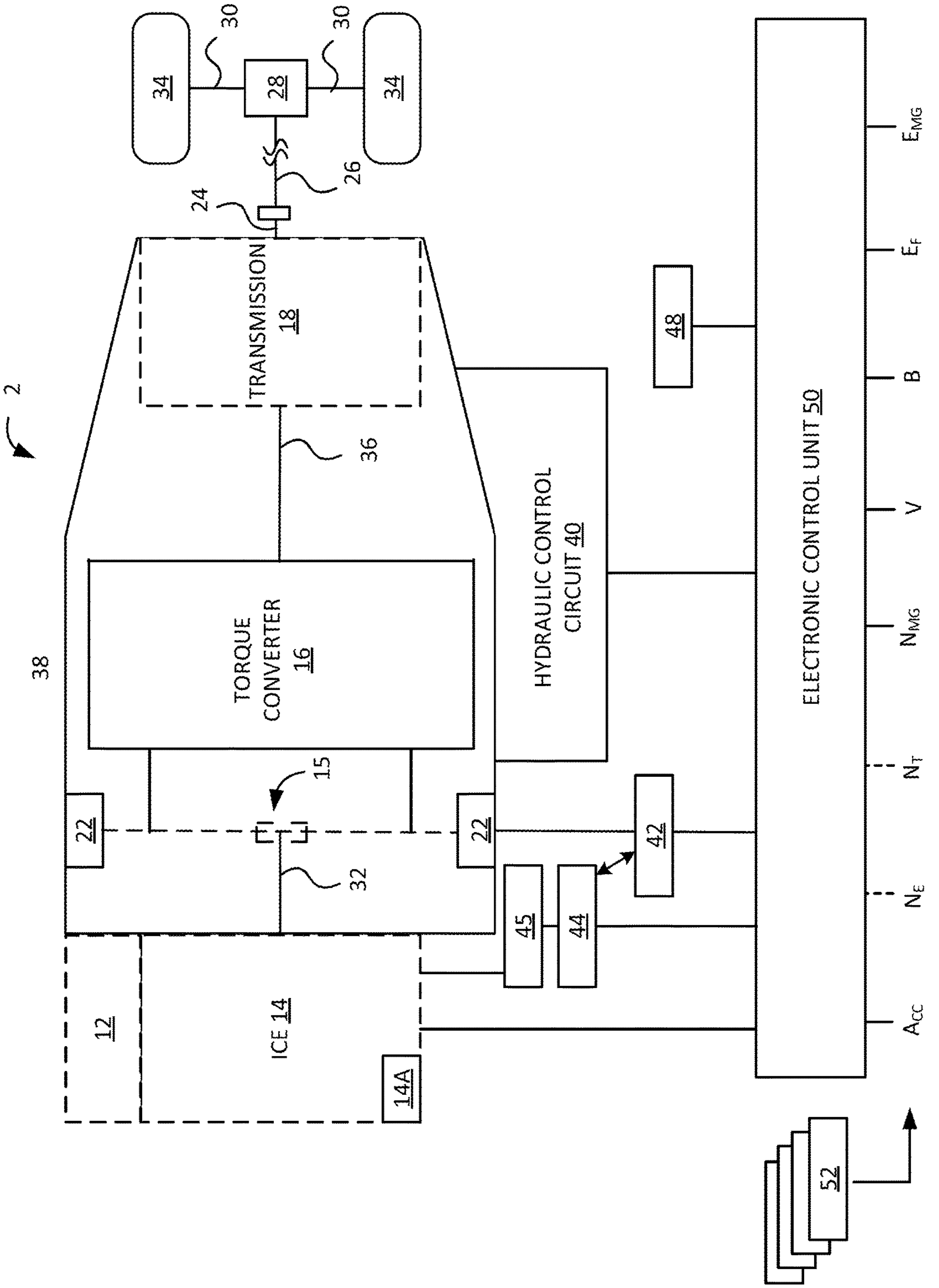
FIG. 1 is a schematic representation of an example hybrid vehicle in which embodiments of the disclosed technology can be implemented.

The figures are not exhaustive and do not limit the present disclosure to the precise form disclosed.

DETAILED DESCRIPTION

Example embodiments of the disclosed technology relate to, among other things, systems, methods, computer-readable media, techniques, and algorithms for adjusting personalized adaptive cruise control (P-ACC) functionality in a vehicle to create a preferred P-ACC mode of operation based on vehicle data. Some existing P-ACC systems are capable of a certain degree of personalization. For instance, some existing P-ACC systems are capable of learning a driver's personalized following gap based on historical trips taken by the driver. However, use of trajectory data corresponding to such vehicle transition states may reduce the accuracy of the driver's learned car-following preferences because such trajectory data is unlikely to represent the driver's actual preferences.

The preferred P-ACC system, according to example embodiments of the disclosed technology, utilizes vehicle data to train a preferred P-ACC driving pattern machine learning model in order to learn a relationship between a driver's cruise control preferences, and the vehicle data. The vehicle data includes internal vehicle data (e.g., in-cabin data), and external vehicle data (e.g., vehicle dynamics data) captured during operation of the vehicle during personalized automatic cruise control (P-ACC) operation. In-cabin data includes various in-cabin characteristics captured during operation of the vehicle. For example, in one embodiment, the in-cabin data includes driver behavior, type of passengers within the vehicle, and age of passengers within the vehicle. In one embodiment, the in-cabin characteristics are captured and compiled before preferred P-ACC mode operation (i.e., a "software first approach") to allow the preferred P-ACC mode of operation to adjust the preferred P-ACC mode of operation before operation. For example, the in-cabin characteristics (e.g., number of passengers, age of passengers, type of passengers etc.) can be determined, and sent to the processor before the cruise control is operated. By determining the in-cabin characteristics before operation of the P-ACC, the preferred P-ACC mode of operation can be a generated/adjusted before the driver engages operation of the preferred P-ACC mode of operation (i.e., a "software first approach). In one embodiment, the type of passengers (e.g., grandparent, child, parent, etc.) is determined using a classifier. Here, the classifier uses captured in-cabin data to determine the type of passenger. The classifier may be part of the processor (and/or controller), or may be separate from the processor (i.e., a remote source) in communication with the processor. Furthermore, to correctly classify the types of passengers in the vehicle, the classifier can store feedback data on whether it has correctly or incorrectly classified the type of passengers in the car. By referencing feedback data, the classifier can be trained (i.e., "learn"), the various characteristics about each type of passenger to further improve its classification decisions.

Vehicle dynamics data includes real-time car-following data. For example, in one embodiment, real-time following data includes one or more driver-initiated actions to adjust the gap between the driver's vehicle (i.e., following vehicle) and the lead vehicle during P-ACC operation. Driver initiated actions are not limited to solely adjusting the gap following distance between the following vehicle and the lead vehicle. For example, the driver initiated actions can include overtaking events, lane changing events, braking events, etc.

The preferred P-ACC system disclosed herein detects a manual intervention (e.g., an overwrite event via braking, accelerating, or adjusting the gap following distance and braking preference using one or more gap, or brake preference buttons on a menu in the user interface) during operation of the preferred P-ACC system. The detection of manual intervention is captured and stored in a remote cloud database as a feedback means to train the P-ACC system. For example, when a manual intervention is detected by the preferred P-ACC system, any vehicle dynamics data captured during preferred P-ACC operation can be used as ground-truth data by one or more machine learning models to update (e.g., continuously train) the preferred P-ACC mode of operation.

Furthermore, internal vehicle data (e.g., in-cabin data) can be used to train the preferred P-ACC driving pattern learning model to learn a relationship between the vehicle data (e.g., internal vehicle data and external vehicle data) and a driver's preferred P-ACC mode of operation. For example, once the learned relationship between the driver behavior and state and number/type of passengers is obtained, it can be fed to second-order vehicle dynamics to determine a target vehicle acceleration/deceleration for achieving a desired following gap based on a lead vehicle's speed. The vehicle may then be controlled to accelerate the vehicle to shorten a following gap based on the internal vehicle data and the driver preferred P-ACC mode of operation. Inversely, the vehicle may be controlled to decelerate the vehicle to a target vehicle deceleration to increase a following gap. The vehicle may also be maintained at a constant speed in order to maintain the following gap. As the lead vehicle's speed changes, the P-ACC algorithm may determine an updated following gap based on the learned relationship, and the vehicle may be accelerated/decelerated to a target acceleration/deceleration for achieving the updated following gap.

The preferred P-ACC system in accordance with example embodiments of the disclosed technology solves the technical problems of reduced accuracy and unsuitability for real-time online application associated with existing P-ACC systems. Existing P-ACC algorithms operate on historical data generated by a driver in driving scenarios in which existing algorithms fail to consider internal vehicle, such as driver behavior, type/number of passengers, and driver feedback. By feeding external vehicle data, in addition to internal vehicle data into the P-ACC driving pattern machine learning model, the P-ACC system can be trained to better understand the driver's intent/P-ACC driving preferences. In addition, the vehicle data (e.g., driver's behavior and number/type of passengers, and driver feedback), can be stored and used to continuously train the P-ACC to more accurately determine the driver's true intents/preferences in future driving scenarios. These learned patterns can be sent to one or more cloud servers 302 and stored at a remote database (e.g., memory 308). As explained in further detail below, these learned patterns can be accessed by any number of other vehicles, and can be used to adjust (e.g., train, optimize, tune etc.) the preferred P-ACC systems of other vehicles. For example, learned patterns from a first vehicle, can be sent to one or more cloud servers 302 and stored as learned pattern data. The learned pattern data can be fetched by a second vehicle and used to adjust default preferred P-ACC settings.

Embodiments of the disclosed technology may be implemented in connection with any of a number of different vehicles including, without limitation, automobiles, trucks, motorcycles, recreational vehicles, or other similar on-or off-road vehicles, and in connection with any of a number of different vehicle types including, without limitation, gasoline-powered vehicles, diesel-powered vehicles, fuel-cell vehicles, electric vehicles, hybrid electric vehicles, or other vehicle types. An example hybrid electric vehicle (HEV) in which embodiments of the disclosed technology may be implemented is illustrated in FIG. 1.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source. For example, a first travel mode may be an engine-only travel mode that only uses internal combustion engine 14 as the source of motive power. A second travel mode may be an electric-only travel mode that only uses the motor(s) 22 as the source of motive power. A third travel mode may be an HEV travel mode that uses both the engine 14 and the motor(s) 22 as the sources of motive power. In the engine-only and HEV travel modes, vehicle 2 relies on the motive force generated at least by internal combustion engine 14, and a clutch 15 may be included to engage engine 14. In the electric-only travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine 14. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operates as a generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc-type hydraulic frictional engagement device whose engagement is controlled by an actuator such as a hydraulic actuator. Clutch 15 may be controlled such that its engagement state is complete engagement, slip engagement, or complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As noted above, vehicle 2 may include an electronic control unit 50. Electronic control unit 50 may include circuitry to control various aspects of the vehicle operation. Electronic control unit 50 may include, for example, a microcomputer that includes one or more processing units (e.g., microprocessors), memory storage (e.g., RAM, ROM, etc.), and I/O devices. The processing units of electronic control unit 50 execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Such sensors can be used to detect, for example, other vehicles on a roadway (e.g., a lead vehicle being followed by a vehicle in which the ACC system is activated), traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as an example of a vehicle system with which embodiments of the disclosed technology may be implemented. One of ordinary skill in the art reading this description will understand how the disclosed embodiments can be implemented with vehicle platforms.

Figure 2:
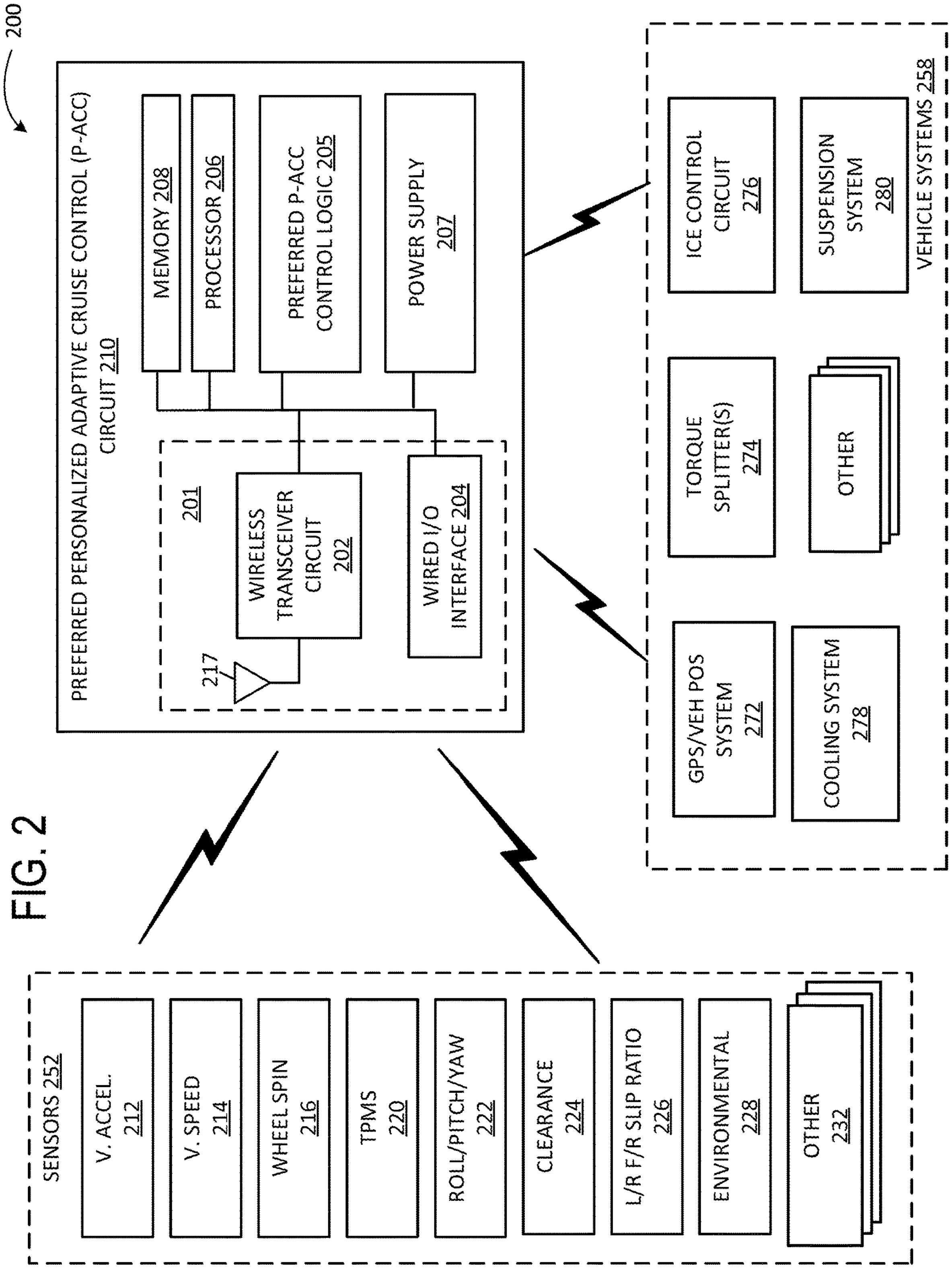
FIG. 2 illustrates an example vehicle system architecture for implementing a preferred personalized adaptive cruise control (P-ACC) functionality based on a preferred ACC mode of operation, according to one or more embodiments.

FIG. 2 illustrates an example vehicle system architecture for implementing preferred P-ACC system functionality based on periods of steady-state vehicle operation in accordance with example embodiments of the disclosed technology. In this example, the preferred P-ACC system 200 includes a preferred P-ACC circuit 210, a plurality of sensors 152, and a plurality of vehicle systems 158. Sensors 152 and vehicle systems 158 can communicate with the preferred P-ACC circuit 210 via a wired or wireless communication interface. Although sensors 152 and vehicle systems 158 are depicted as communicating with the P-ACC circuit 210, they can also communicate with each other as well as with other vehicle systems. P-ACC circuit 210 can be implemented as an ECU or as part of an ECU such as electronic control unit 50. In other embodiments, the preferred P-ACC circuit 210 can be implemented independently of the ECU.

In this example, the P-ACC circuit 210 includes a communication circuit 201, a server 203, and a power supply 207. The server 203 further includes P-ACC steady-state detection/data capture logic 205A and P-ACC control logic 205B. Components of P-ACC circuit 210 are illustrated as communicating with each other via a data bus, although other communication interfaces can be included. Although not depicted, P-ACC circuit 210 may also include a manual assist switch that can be operated by the user to manually select a personalized mode for the ACC system in order to enable its P-ACC functionality.

Processor 206 can include a graphical processing unit (GPU), a central processing unit (CPU), a microprocessor, or any other suitable processing unit/system/chip. The memory 208 may include one or more various volatile and/or non-volatile forms of memory/data storage (e.g., flash memory, random access memory (RAM), etc.) into which the logic 205A and/or the logic 205B can be loaded, along with any data, variables, etc. received as input to the logic 205A and/or logic 205B, in order to be executed by processor 206. In particular, memory 208, can be made up of one or more modules of one or more different types of memory, and may be configured to store data and other information as well as operational instructions that may be used by the processor 206 to enable functionality of the preferred P-ACC circuit 210.

Although the example of FIG. 2 is illustrated using processor and memory circuitry, as described below with reference to circuits disclosed herein, server 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up P-ACC circuit 210.

The P-ACC circuit 210 further includes preferred P-ACC control logic. In one embodiment, upon capturing vehicle data, the processor 206 may execute the preferred P-ACC control logic 205 as training data for a P-ACC driving pattern machine learning model to train the model to learn a relationship between a driver-preferred following gap and a vehicle dynamics parameter such as vehicle speed. In some embodiments, the P-ACC driving pattern model and its associated learned relationship may be specific to a particular driver's behavior/preferences. In some embodiments, multiple P-ACC driving pattern models may be trained for an individual driver, where each trained model may relate to a specific driver mood, weather scenario, frequently traveled route, geographic location, terrain, or the like. The P-ACC control logic 205 may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Communication circuit 201 may be either or both of a wireless transceiver circuit 202 with an associated antenna 217 or a wired I/O interface 204 with an associated hardwired data port (not illustrated). As this example illustrates, communications with P-ACC circuit 210 can occur via wired and/or wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 217 is coupled to wireless transceiver circuit 202 and is used by wireless transceiver circuit 202 to transmit radio frequency (RF) signals wirelessly to wireless equipment with which it is connected and to receive radio signals as well. These RF signals can include information of almost any sort that is sent or received by P-ACC circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 207 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply 207.

Sensors 152 can include, for example, any of the types of sensors described with respect to sensors 52 depicted in the example of FIG. 1. For instance, the sensors 152 may include inertial sensors (e.g., inertial measurements units (IMUS), accelerometers, gyroscopes, etc.) configured to capture acceleration, velocity/speed, and orientation data; temperature sensors; vibration sensors; sensors configured to capture data relating to the operation of electrical (e.g., battery) and/or mechanical (e.g., powertrain) components of the vehicle; and so forth. The sensor data captured by such sensors 152 may include data indicative of vehicle operating parameters such as position/location data; speed/velocity data; acceleration data; braking data; steering data; and so forth. In some embodiments, sensors 152 may include additional sensors that may or not otherwise be included on a standard vehicle in which the P-ACC system 200 is implemented.

In example embodiments, the sensors 152 may be configured to continuously monitor and capture data relating to an environment, operational parameter, or the like. In some embodiments, a sensor 152 may periodically capture data according to a predetermined schedule (e.g., a sampling rate, a scanning rate of a LiDAR, etc.). In some embodiments, the sensor data may include image data of an environment surrounding a vehicle. The image data of the vehicle's external environment may be captured at a selected frame rate by a collection of cameras. The cameras may be disposed such that different cameras capture image data of different portions of the external environment. In example embodiments, the sensor data representative of sensed characteristics within a vehicle's external environment may further include three-dimensional (3D) point cloud data captured by a LiDAR, radar data, and the like.

In the illustrated example, sensors 152 include vehicle acceleration sensors 212, vehicle speed sensors 214, wheel-spin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of the P-ACC system 200.

Vehicle systems 158 can include any of a number of different vehicle components or subsystems used to control or monitor various aspects of the vehicle and its performance. In this example, the vehicle systems 158 include a Global Positioning System (GPS) or other vehicle positioning system 272; torque splitters 274 they can control distribution of power among the vehicle wheels such as, for example, by controlling front/rear and left/right torque split; ICE control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

Additionally, communication circuit 201 can be used to send an activation signal or other activation information to various vehicle systems 158 as part of activating the preferred P-ACC system 200. For example, as described in more detail below, communication circuit 201 can be used to send signals to, for example, one or more of: torque splitters 274 to control front/rear torque split and left/right torque split; ICE control circuit 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152.

Figure 3:
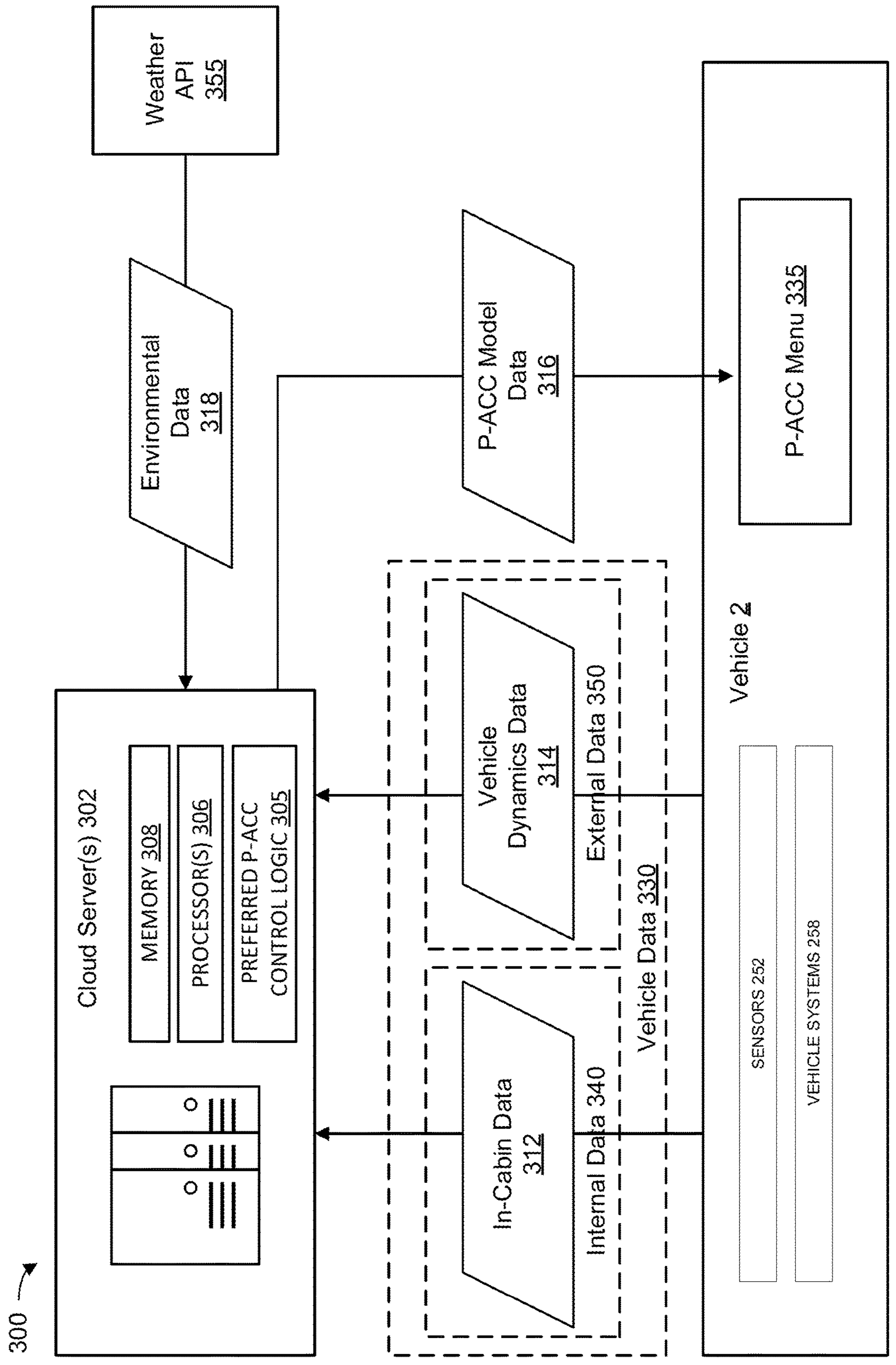
FIG. 3 is an example schematic of a network configuration for implementing the preferred P-ACC mode of operation, according to one or more embodiments.

Various elements/components may be included or may make up a network configuration in which embodiments of the disclosed technology may be implemented or used. FIG. 3 is an example schematic of a network configuration for implementing the preferred P-ACC mode of operation, according to one or more embodiments. In at least one embodiment, the network 300 elements include the vehicle 2, and one or more cloud server(s) 203. As seen in FIG. 3, vehicle data 330 is communicatively exchanged between the vehicle 2 and the one or more cloud servers 302. Here, vehicle data 330 comprises internal data 340 (e.g., in-cabin data 312) and external data 350 (e.g., real time car following data).

Internal data 340 and external data 350 may be captured by sensors, vehicle systems, V2V communications with other vehicles, and/or V2I communications from roadside equipment and/or infrastructure. For example, in one embodiment, the in-cabin data 312 and vehicle dynamics data 314 (e.g., the real time car following data) is captured by the vehicle sensors 252 and/or vehicle systems 258. The vehicle-related data is communicated to a server (e.g., cloud server 203) over a network via V2X communications.

In an alternative embodiment, the real-time car following data 614 is gathered from a remote data source (e.g., a server storing location data of one or more vehicles). Vehicle data 330 can be captured throughout various times of vehicle operation. For example, in one embodiment, vehicle data 330 can be captured during preferred P-ACC operation. In another embodiment, vehicle data can be captured throughout vehicle operation regardless of whether the vehicle is operated in a P-ACC mode. As explained in further detail below, captured vehicle data 330 is sent to and received by one or more cloud servers 203 housing the personalized adaptive cruise control (P-ACC) circuit 210.

Here, the vehicle 2 outputs in-cabin data 312 and outputs vehicle dynamics data 314 (e.g., real-time car following data). The in-cabin data 312 and vehicle dynamics data 314 is sent from the vehicle 2 to the cloud servers 203. The cloud server(s) 203 receive the in-cabin data 312 and vehicle dynamics data 314. In addition to receiving the in-cabin data 312 and vehicle dynamics data 314, the cloud servers also receive environmental data 318 from the weather API 355.

The cloud servers 203 use vehicle data 330 to train a predictive model (e.g., a preferred P-ACC mode of operation) and output (i.e., return) P-ACC model data 316. The P-ACC mode data 316 is sent to the P-ACC menu 335. In one embodiment, vehicle data 330 is retrieved from storage (e.g., memory 308) and used with AI techniques to train the predictive model. The vehicle data 330 includes patterns of data that can be used to train the predictive model (i.e., learned patterns). For example, various embodiments herein apply inverse reinforcement learning (IRL) to the vehicle data 330 from operations 410 and 420 to train a predictive model corresponding to the driving style and behaviors of the driver. The predictive model may be a reward function 440 that can be applied to observed states (e.g., a current demonstration) to infer actions as to how a driver will behave during the current demonstration. Accordingly, IRL is used in various embodiments herein to learn the driver's driving preference from historical behavior (e.g., historical demonstrations).

External historical state sequence 410 data and internal historical state sequence 420 data may be received at a set transmission/reception rate, which may be any rate desired based on the application. In some embodiments, vehicle data 330 may be received as it is collected. For example as vehicle data 330 is captured it is transmitted in a serial manner to cloud server 203. In another example, vehicle data 330 is stored locally using in-vehicle memory and is transmitted as a block of demonstration data sets. In some embodiments, the vehicle data 330 may be stored with timestamps and then associated, either on vehicle or in the cloud, with other vehicle data 330 so to group the data into a set of demonstration that is based on the timestamp. For example, timestamps that fall within a set time frame (e.g., 1 second, 5 second, etc.) may be considered as a single demonstration and associated together.

Receiving vehicle data 330 at the cloud server 203, may include receiving vehicle data 330 along with an associated driver identifier. The vehicle data 330 may be stored in a cloud based database (e.g., memory 308) according to the driver identifier. In this way, vehicle data 330 from a plurality of drivers may be received and separately associated with the proper driver. Thus, vehicle-data 330 for each driver may be used to learn a corresponding digital twin model for that specific driver.

Figure 4:
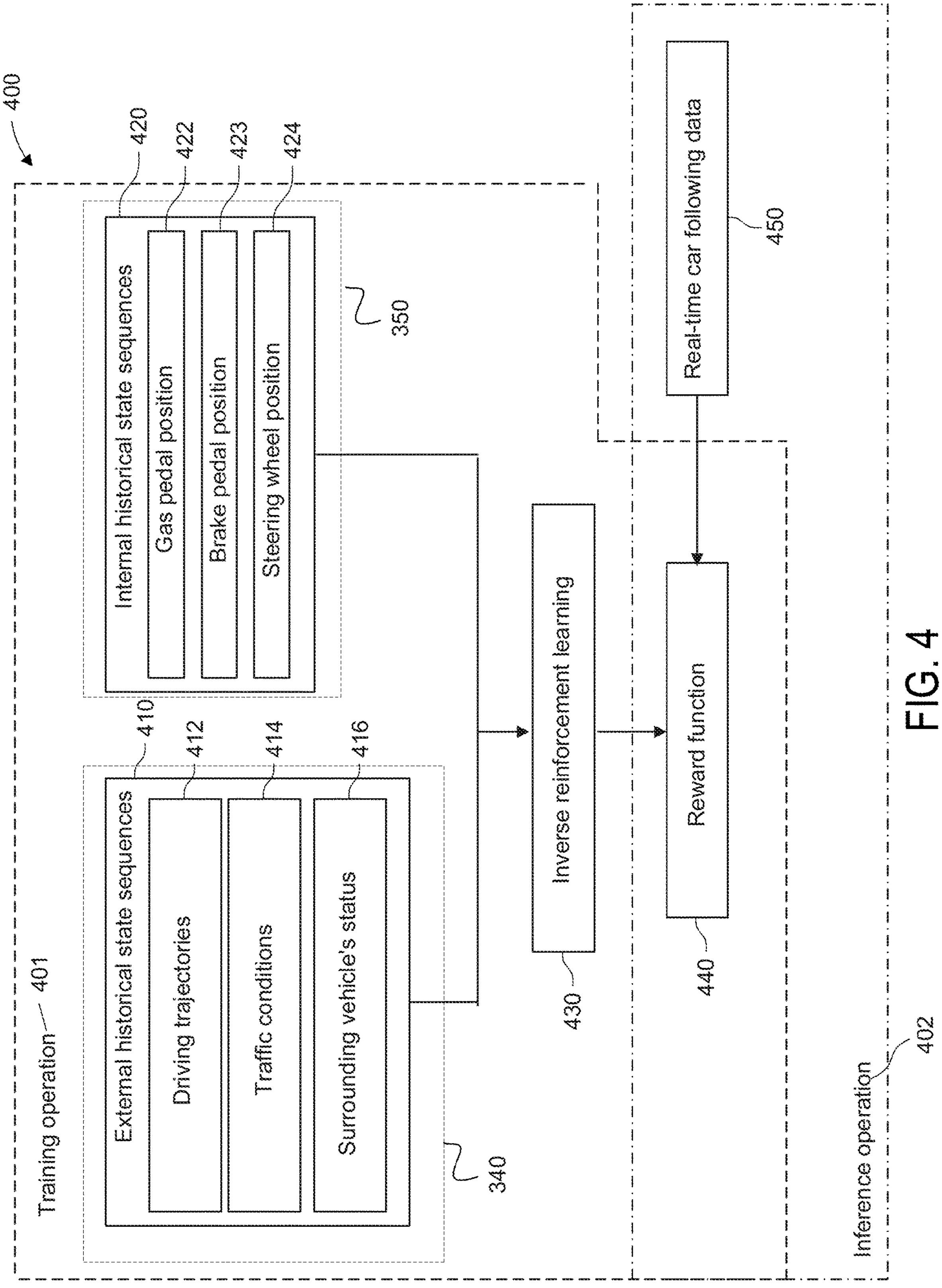
FIG. 4 is a flow chart illustrating example operations that can be performed by the preferred P-ACC system in accordance with embodiments of the present disclosure.

FIG. 4 is a flow chart illustrating example operations that can be performed by the preferred P-ACC system in accordance with embodiments of the present disclosure. Here, the operations include a training operation 401 and an inference operation 402.

Training operation 401 trains a predictive model 400 using an external historical state sequence operation 410, an internal historical state sequence 420 and inverse reinforcement learning 430 to train a predictive model. The predictive model is discussed in further detail below. The training operation 401 includes an external historical state sequence operation 410 and an internal historical state sequence operation 420. The external historical state sequence operation 410 includes a driving trajectory operation 412, a traffic condition operation 414 and a surrounding vehicle status operation 416. The internal historical state sequence operation 420 includes a gas pedal position operation 422, a brake pedal position operation 423, and a steering wheel position operation 424. Both the external historical state sequence operation 410 and the internal historical state sequence operation 420 use vehicle data 330 to perform their respective operations. For example external historical state sequence operation 410 uses external vehicle data 340, and internal historical state sequence operation 420 uses internal vehicle data 350, and external historical state sequence data 410 to train to train the predictive model. The internal historical state sequence data 420 includes in-cabin data 312. The external historical state sequence data 420 includes vehicle dynamics data (i.e., external data).

In one embodiment, operation 410 includes sub-operations 412-416. At operation 412, driving trajectories of the vehicle are received and/or calculated. For example, geographic location information may be collected, for example, by GPS/vehicle positioning system 272, and the position may be tracked over a number of positions while traveling. The position may be sampled at set times, such that the direction of travel and speed of travel may be calculated and supplied as a trajectory. Additionally, trajectory may be determined based on vehicle speed, for example, from vehicle speed sensors 52B, and/or accelerometer 52E.

At operation 414, traffic conditions affecting P-ACC operation of the vehicle are received by the P-ACC systems. Traffic conditions may be collected at the vehicle based on V2V and/or V2I communications reporting traffic conditions ahead of and surrounding the vehicle. Additionally, traffic conditions may be collected by proximity sensor 52F, and/or environmental sensors 52H. Furthermore, the GPS system 272 may report traffic conditions either to the vehicle over V2X communications and/or directly to the cloud. Traffic conditions include traffic conditions affecting vehicle operation (i.e., traffic conditions present in a location/area in which the vehicle is being operated).

At operation 416, status of surrounding vehicles (e.g., speed, acceleration, maneuvering, etc.) is received by the P-ACC circuit 210. Status of surrounding vehicles may be collected at the vehicle based on V2V and/or V2I communications reporting status of surrounding the vehicles. Additionally, such status may be collected by proximity sensor 52F, and/or environmental sensors 52H.

Operation 420 may also include sub-operations 422-424. For example, operation 422 includes receiving gas pedal position information, for example, from the vehicle accelerator sensor 52A. Operation 423 includes receiving brake pedal position information, for example, from the brake sensor 52D. Operation 424 includes receiving steering wheel position information, for example, from the steering wheel sensor 52J or derived from the wheel angle sensor 52G. Such information, when combined with trajectory information, traffic conditions, and surrounding vehicle status information may represent historical demonstrations of driving style and behavior under the various conditions.

Other conditions may also be used to determine driving behavior. For example, vehicle acceleration, speed, and heading may be used in a manner similar to the accelerator/brake pedal positions and steering wheel information. Additionally, other external conditions, such as weather, time of day, vehicle type, road condition, road type, etc., may be used as well.

At the inverse reinforcement learning operation 430, vehicle data 330 is retrieved from storage (e.g., memory 308) and used with AI techniques to train the predictive model. For example, various embodiments herein apply inverse reinforcement learning (IRL) to the vehicle data 330 from operations 410 and 420 to train a predictive model corresponding to the driving style and behaviors of the driver. The predictive model may be a reward function 440 that can be applied to observed states (e.g., a current demonstration) to infer actions as to how a driver will behave during the current demonstration. Accordingly, IRL is used in various embodiments herein to learn the driver's driving preference from historical behavior (e.g., historical demonstrations).

For example, driving behavior of a given driver may be represented as a sequential decision process of a rational agent. This sequential decision process can be modeled using a Markov Decision Process (MDP). Formally, an MDP is defined as:

$$\mathcal{M}=\{\mathcal{S},\mathcal{A},T(a,t),R_{74}(s,a;\theta)\} \quad \text{Eq. 1}$$

where $\mathcal{S}$ is a state space of states s an agent can visit; $\mathcal{A}$ is a set of actions a that the driver may perform, T is a transition function representing how actions move an agent from one state to the next state; and R is an instantaneous reward function 440 of given action a at state s parameterized by parameterization factor θ.

The MDP is used in various embodiments to describe the personalized driving activity in different traffic scenario, for example, as defined based on the vehicle-related data. For example, states may include driving trajectory (e.g., operation 412), traffic condition (e.g., operation 414), and the status of the surrounding vehicles (e.g., operation 416). Actions may include the driver's maneuvering, for example, gas pedal position (e.g., operation 422), brake pedal position (e.g., operation 424), and steering wheel position (e.g., operation 425).

Personal driving style and behavior can be described as a reward function 440 of the state space, where the driver usually performs optimally or near-optimally in terms of a cumulative reward of the reward function 440 over time. That is to say, if the driver is not affected by hazard perception ability, a $(s, a)_t$ sequence should have a high score in terms of the following equation:

$$V(\xi)=\sum_{t=0}^{N}\gamma^{t}\cdot R_{\theta}(s,a;\theta) \quad \text{Eq. 2}$$

where ξ is a sample demonstration; γ is a discount factor; and $R_\theta(s,a;\theta)$ is the reward function 440 as a function of states s and actions a parameterized by θ. The value V represents the cumulative reward over time 0 to N, where N is the set time window. The length of N may depend on the length of the event and the sample rate.

During the inverse reinforcement learning operation 430, IRL is applied at operation 330 to recover the reward function 440 of the driver by calculating the parameters θ based on the historical vehicle-related data as inputs into the IRL. The recovered reward function 440 is then stored, for example, in cloud server 230, with the associated driver.

During the inference operation, the reward V(ξ) can be calculated based on sample demonstrations to assess current performance of the driver in terms of the personal driving style, for example, the reward function 440 stored at operation 340. Sample demonstrations may include similar information as the historical demonstrations, for example, a sample trajectory, traffic conditions, and surrounding vehicle status and driver's actions.

For example, at operation 450, real-time car following data is received by the reward function 440. Real-time car following data received at operation 450 may be the same and/or similar types of data as receive at operations 410 and 420. Additionally, real-time car following data may be received in the same manner as that of operations 410 and 420 described above.

The trained model (e.g., from the inverse reinforcement learning operation 430) is retrieved from storage, for example, by locating the model associated with the driver identified included with the vehicle data 330 from the inverse reinforcement learning operation 430. The model may be the reward function 440 recovered by application of IRL. For example, the cloud sever 230 communicates a notification to the vehicle over a V2X communication, which the vehicle reports to the driver (e.g., via a display, instrument panel, haptic feedback, audio, etc.). In some embodiments, alone or in combination with the vehicle to driver notification, the cloud sever 230 communicates a notification to the vehicle over a V2X communication and the vehicle enters an autonomous or semi-autonomous operational mode (e.g., takes control from the driver to ensure safety of the driver and surroundings).

Figure 5:
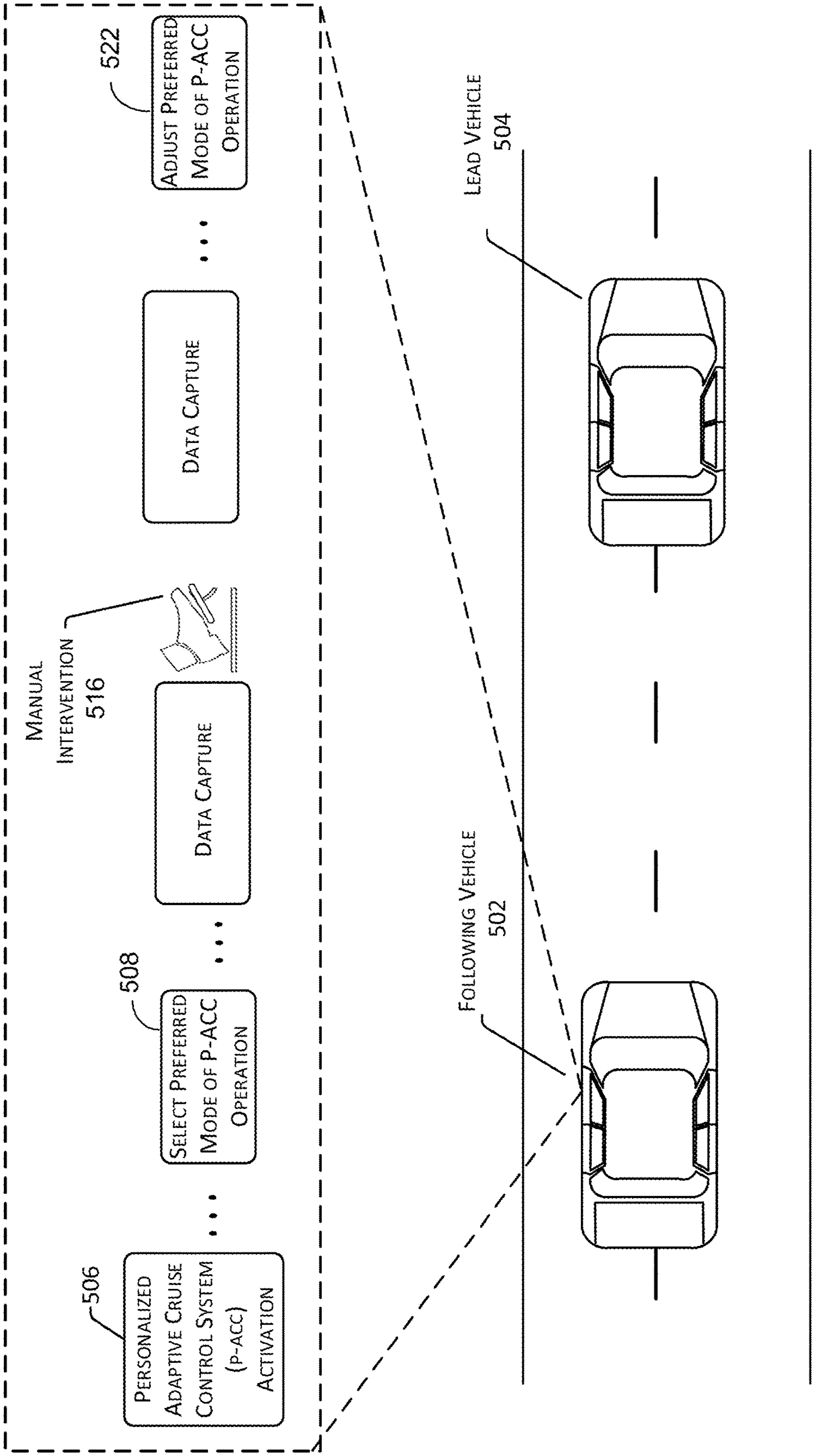
FIGS. 5-7 schematically illustrate alteration of the preferred mode of P-ACC mode of operation based on vehicle data captured during the periods of a preferred mode of P-ACC of operation, according to multiple embodiments.

FIG. 5 schematically illustrates alteration of the preferred mode of P-ACC mode of operation based on vehicle data 330 captured during the periods of a preferred mode of P-ACC of operation, according to one or more embodiments. FIG. 5 includes a lead vehicle 504 and a following vehicle 502.

The vehicles 502, 504 may each be any suitable type of vehicle including, without limitation, automobiles, trucks, motorcycles, recreational vehicles, or other on-or off-road vehicles. In addition, the vehicles 502, 504 may be vehicles that utilize any of a variety of technologies and/or fuel sources for generating motive force including, but not limited to, hybrid electric vehicles, gasoline-powered vehicles, diesel-powered vehicles, fuel-cell vehicles, electric vehicles, or the like. In some example embodiments, the vehicle 502 and/or the vehicle 504 may be an autonomous vehicle capable of fully autonomous operation; a semi-autonomous vehicle capable of performing some but not all vehicle operations autonomously; or the like. In those example embodiments in which the vehicle 502 and/or vehicle 504 is a fully autonomous vehicle, even though a human driver may not be required to operate the vehicle, a safety driver may nonetheless be present to comply with governmental regulations, address safety/liability concerns, and potentially take over control of the vehicle in the event of a vehicle system failure.

A vehicle operator (not depicted) may be present in the vehicle 502 and/or the vehicle 504. The vehicle operator may actively control operation of the vehicle 502,504, or in the scenario in which the vehicle is performing an autonomous/semi-autonomous function (e.g., the ACC system is activated), the vehicle operator may not be actively controlling certain functionality of the vehicle (e.g., longitudinal acceleration), but may be capable of taking over manual control of such functionality at will or in the event of system failure.

The following vehicle 502 may be equipped with the preferred P-ACC system 200 according to embodiments of the disclosed technology. Upon initial activation of the preferred P-ACC system 200 at block 506, the vehicle 502 may be automatically controlled to follow vehicle 504 at a following gap determined according to an initial control strategy, such as that provided by a speed-gap table. If, for example, the driver of vehicle 502 is uneasy with this initial control strategy (e.g., is not comfortable with the current following gap distance), the driver may initiate a manual intervention 516 which results in the driver attempting to overwrite control of the vehicle while the vehicle is operating in a P-ACC mode.

The manual intervention 516 may be a driver's engagement of a braking mechanism of the vehicle 502 (e.g., depressing a brake pedal). The driver of vehicle 502 may perform the manual intervention 516 if, for example, he/she is uncomfortable with the following gap being maintained according to the initial control strategy and seeks to increase the following gap. The preferred P-ACC system 200 may transition to a deactivated state responsive to the manual intervention 516, and may require manual reactivation. Although the P-ACC system 200 may be in a deactivated state, vehicle data 330 can continue to be captured by sensors 252 and vehicle systems 258. For example, subsequent to the manual intervention 516, the driver of vehicle 502 may manually operate the vehicle—which may include any number of additional engagements of the accelerator and/or braking mechanisms of the vehicle 502—until a desired following gap is achieved, at which point, the driver may reactivate 310 the P-ACC system 200. Throughout this example manual intervention 516 vehicle data 330 can continue to be captured. Responsive to reactivation 510 of the preferred P-ACC system 200, the processor 206 of the preferred P-ACC circuit 210 may execute machine-executable instructions to initiate a waiting period for activation of a preferred mode of P-ACC operation. Vehicle data 330 captured during the preferred mode of P-ACC operation can be stored in a remote database (e.g., memory 308) and used to train the predictive model 400. The predictive model 400 can be individually adjusted for each driver of vehicle 502.

Figure 8A:
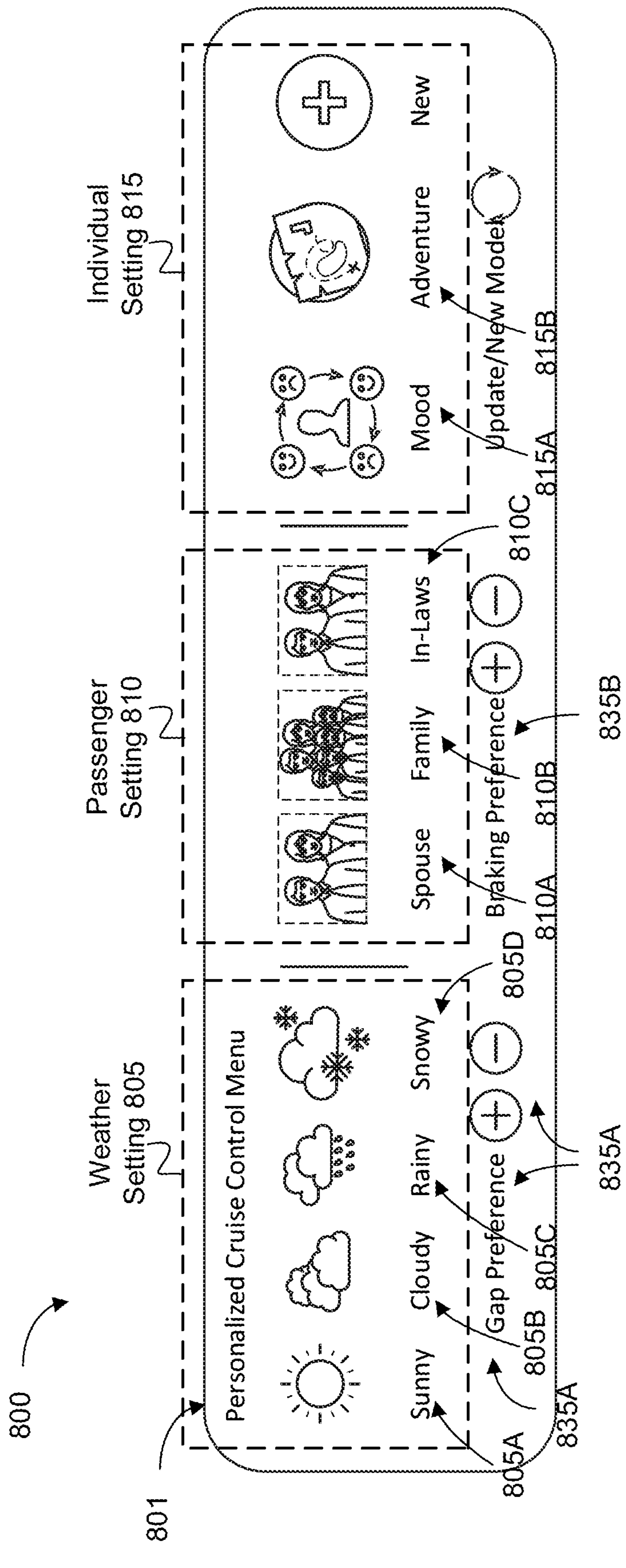
FIGS. 8A-8B are example illustrations of an P-ACC menu included in an automotive user interface (UIs), through which the preferred ACC mode may be operated by a user, according to one embodiment.
Figure 8B:
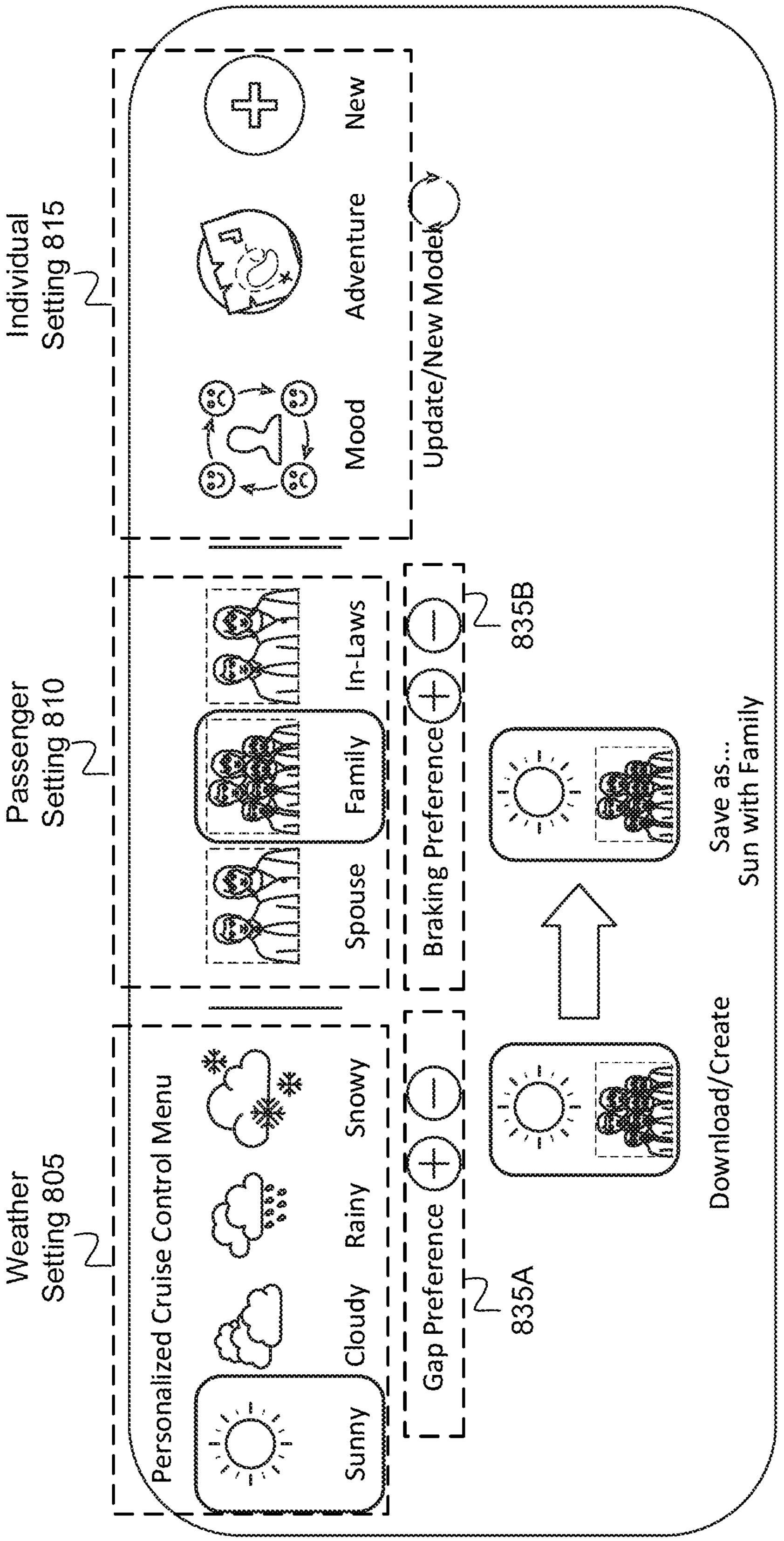

In an alternative embodiment, the driver's manual intervention may include adjusting one or more preferred P-ACC mode of operation parameters via the UI 800. As seen in FIGS. 8A-8B, the UI 800 includes a menu 801, and one or more preferred P-ACC mode of operation preference buttons. The preferred P-ACC mode of operation preference button 835 For example, the driver may desire to increase the gap distance between the vehicle 2 (i.e., following vehicle 502) and the lead vehicle 504, by activating the gap preference button 835A in menu 801. By activating the + or − setting on the gap preference button 835A, the driver can manually intervene to adjust the preferred P-ACC mode of operation to increase or decrease the gap between the following vehicle 502 and the lead vehicle 504. Alternatively, by activating the + or − setting on the braking preference button 835B in menu 801, the driver can manually intervene to adjust the preferred P-ACC mode of operation 522 to accelerate/decelerate.

Figure 6:
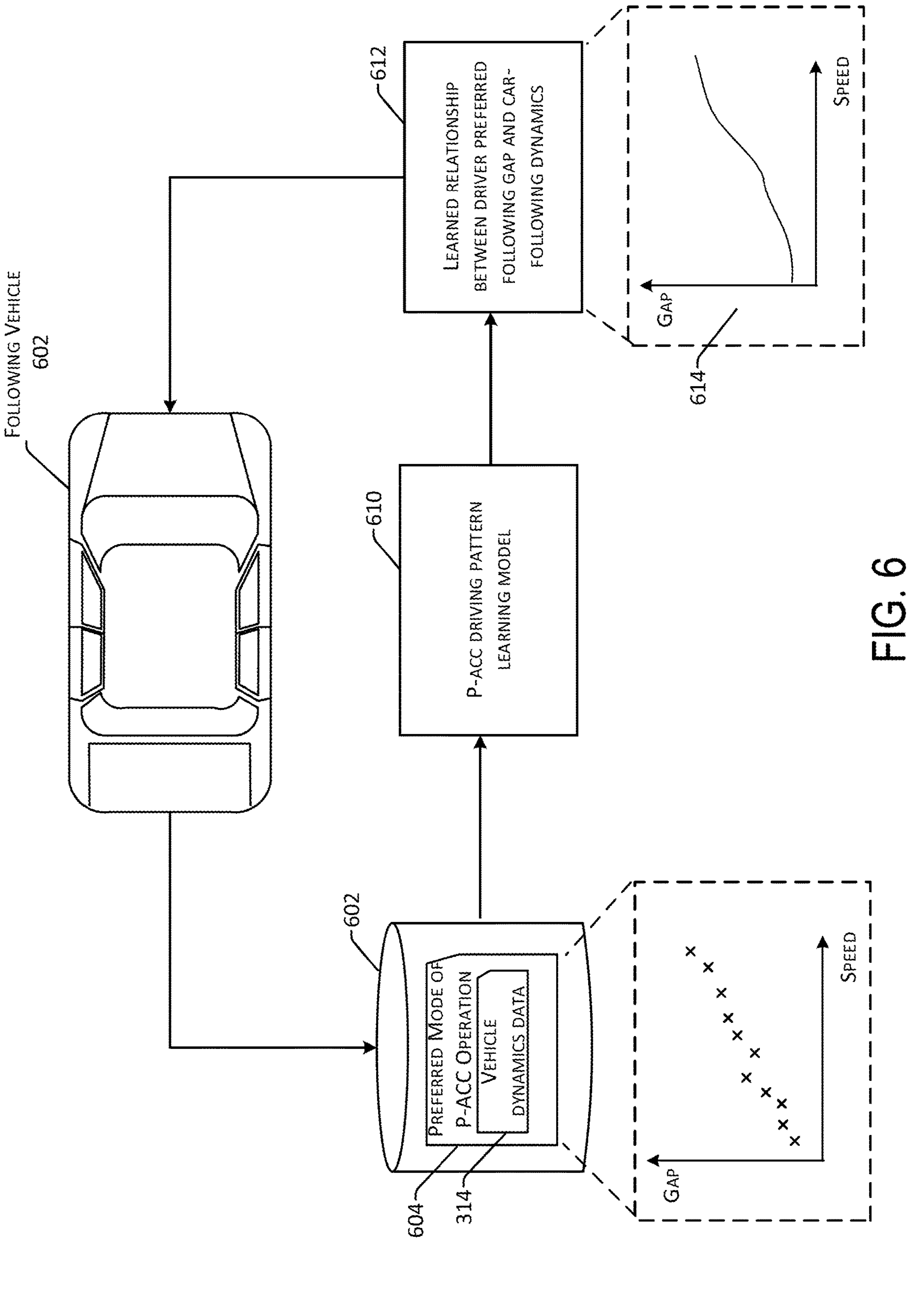

Referring now to FIG. 6, training of the preferred P-ACC predictive model based on ground-truth, steady-state data is illustratively depicted. Vehicle data 330 is shown as being stored in one or more datastores 602. The vehicle data 330 may include vehicle dynamics data 606 captured during operation of the vehicle 502. The vehicle dynamics data 314 may include, without limitation, acceleration data for the following vehicle 502 and/or the followed vehicle 504; velocity/speed data for the following vehicle 502 and/or the followed vehicle 504; following gap distance data indicative of distance headway between the followed vehicle 504 and the following vehicle 502; and so forth. For instance, the vehicle dynamics data 314 may include a set of data points 508 indicative of following gaps maintained at different vehicle speeds during periods of operation of the vehicle 502.

In some embodiments, an onboard ECU of the vehicle 502 (e.g., ECU 50) may include the datastore(s) 604 storing the steady-state data 604. The vehicle data 330 may be updated in real-time as new vehicle dynamics data 314 is captured during periods of vehicle steady-state operation. The vehicle data 330 is significantly less noisy than raw trajectory data because it does not include data corresponding to periods of non-steady-state operation such as vehicle transition states and/or non-car following states. Further, because the vehicle data 330 excludes vehicle dynamics data corresponding to periods of non-steady-state operation, it is more storage efficient.

In some embodiments, the vehicle data 330 may be specific to a particular driver. That is, distinct vehicle data 330 may be captured and stored for each driver. In some embodiments, a particular driver may be identified based on some form of user authentication (e.g., biometrics, username/password, etc.) and a corresponding user profile for the driver may be accessed to, in turn, access the steady-state data for that driver. Alternatively, a driver may be prompted to select their user profile from available profiles upon activation of the preferred P-ACC system 200.

In some embodiments, the vehicle data 330 may be fed as input training data to a preferred P-ACC driving predictive model 400 to learn a relationship 612 between a driver-preferred following gap and car-following vehicle dynamics such as vehicle speed. The learned relationship is illustratively depicted in plot 614. In some embodiments, the preferred P-ACC predictive model 400 may be a Gaussian mixture model (GMM), which is trained as a joint probability distribution of following gap, velocity, and other vehicle states, as representing in the vehicle data 330.

In example embodiments, the linear combination of Gaussian distributions of the GMM model is given by the following equation:

$$p(x) = \sum_{i=1}^{M} \pi_i p(x|\mu_i, \sigma_i), \quad \text{(Eq. 1)}$$

where M is the number of Gaussian distributions, and $\pi_i$ is the weight of the ith component of a multivariate Gaussian distribution. The relationship between the driver's preferred following gap and the car-following vehicle dynamics (e.g., speed/acceleration of the following vehicle 502; speed/acceleration of the followed vehicle 504) may then be calculated based on the learnt distribution of the GMM model using the maximum likelihood principle, for example. Because the amount of vehicle data 330 is substantially less than the raw vehicle trajectory data, the GMM learning process is very fast, thereby enabling the control strategy of the preferred P-ACC system 200 to be updated in real-time while driving.

Figure 7:
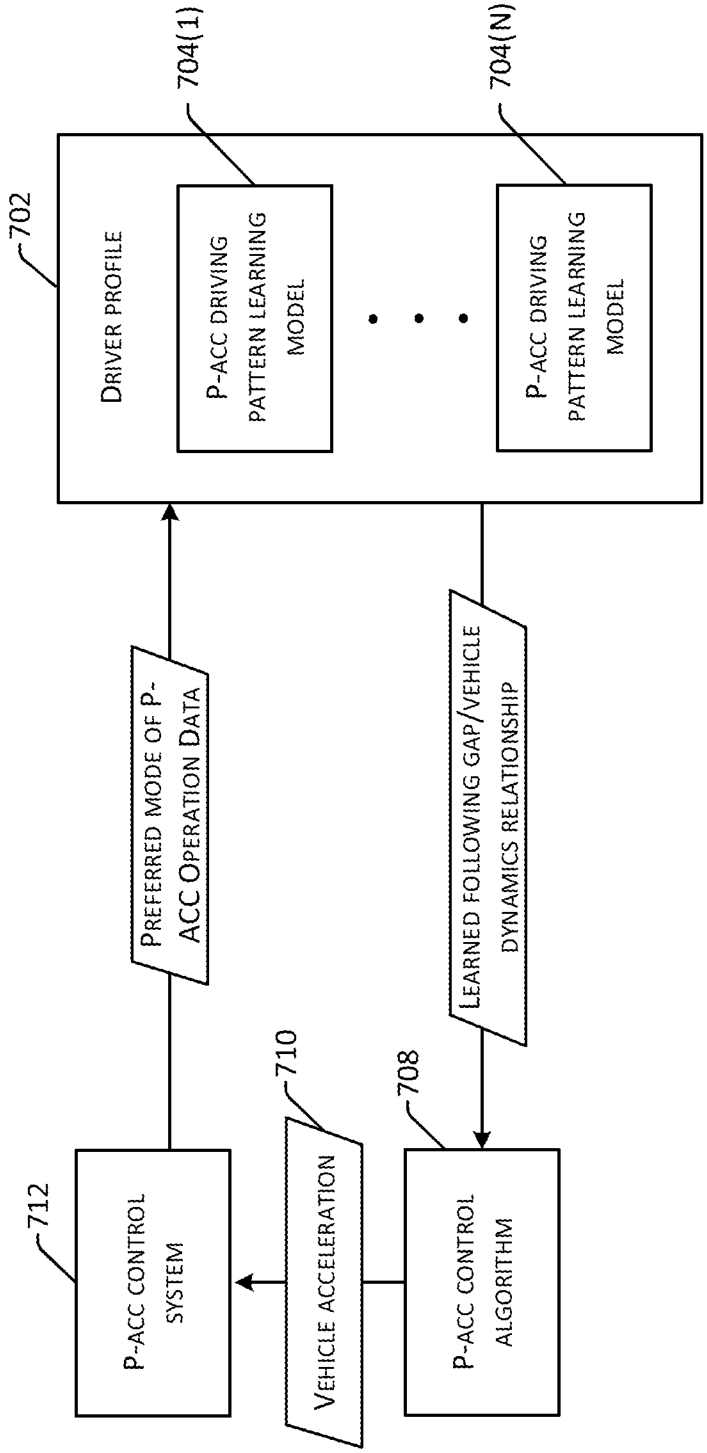

Once the learned relationship is obtained from the predictive model 400, it can be fed into second-order vehicle dynamics to determine a target acceleration for the preferred P-ACC system 200 to achieve the desired following gap given current vehicle speed. This is illustratively depicted in FIG. 7. An example driver profile 702 is depicted, which may be specific to a particular driver. In some embodiments, the driver profile 702 may contain multiple P-ACC driving pattern learning models 704(1)-704(N) for the particular driver (generically referred to herein as P-ACC driving pattern learning model 704). Each learning model 704 may be specific to a particular driving scenario, thereby accounting for the possibility that a driver's preferred following gap may vary for a given vehicle speed depending on the driving environment.

For instance, a driver's preferred following gap may vary based on weather conditions (e.g., a driver may prefer a larger following gap at a given speed in rainy, snowy, icy, foggy, or other hazardous driving conditions); traffic conditions (e.g., a driver may prefer a smaller following gap at a given speed in high-traffic conditions); time-of-day (e.g., a driver may prefer a larger following gap at a given speed during daylight hours as compared to nighttime driving during which visibility may be poor); route being travelled (e.g., a driver may prefer a smaller following gap for a route that he frequently travels as compared a new/unfamiliar route); and so forth. In some embodiments, different learning models 704 may be provided for different driver moods/driving modes. For instance, a driver may select a "rush mode" that corresponds to a learning model 704 that produces a smaller following gap at a given speed as compared to a "leisure mode" indicative of the driver's preference for a more casual driving experience in which a larger following gap is maintained at a given speed. Regardless of the particular driving conditions, the relationship between following gap and car-following vehicle dynamics obtained from the model 704 corresponding to those driving conditions may be learned over time based on vehicle dynamics data 330.

In example embodiments, a learned relationship 706 obtained from a particular selected P-ACC driving pattern learning model 704 may be inputted to a P-ACC longitudinal control algorithm 708 to determine a target acceleration 710 for the vehicle 702. For instance, given second-order vehicle dynamics $$\dot{r}_i(t)=v_i(t) \quad \text{(Eq. 2)}$$

and $$\dot{v}_i(t)=a_i(t) \quad \text{(Eq. 3)}$$

where $r_i(t)$, $v_i(t)$, and $a_i(t)$ denote longitudinal position, longitudinal speed, and longitudinal acceleration of vehicle i at time t, respectively, the control algorithm 708 may be a consensus algorithm for calculating the desired target acceleration 710 of the following vehicle (e.g., vehicle 502).

In example embodiments, the control algorithm 708—which may be a double-integrator distributed consensus algorithm—can be formulated as a car-following problem, where given $l_i$ and $l_j$ (denoting the length of the following (ego) vehicle i and the followed (front/leading) vehicle j, respectively), and $r_i(0)$, $v_i(0)$, $a_i(0)$, $r_j(0)$, $v_j(0)$, $a_j(0)$, the ego vehicle is longitudinally controlled such that $$r_i(t)\rightarrow r_j(t)-r_{headway} \quad \text{(Eq. 4)}$$

$$v_i(t)\rightarrow v_j(t) \quad \text{(Eq. 5)}$$

$$a_i(t)\rightarrow a_j(t) \quad \text{(Eq. 6)}$$

where "→" indicates that the value on the left-hand side converges to the value on the right-hand side, and $r_{headway}$ is the desired distance headway (i.e., following gap) between vehicle i and vehicle j.

In some embodiments, some modifications may be needed to adapt the above-described consensus algorithm to the car-following scenario. In particular, in a standard formulation of the consensus algorithm, the desired position between the two agents is zero, i.e., $r_i(t)-r_j(t)\rightarrow 0$. However, in a car-following scenario, the position difference between vehicle i and vehicle j does not converge to 0, but rather to $r_{headway}$. In addition, the standard formulation of the consensus algorithm does not consider delay, whereas the actuation delay in ACC systems is generally non-negligible.

Accordingly, in example embodiments, the longitudinal P-ACC control algorithm 708 is given by the following equations:

$$\dot{r}_i(t) = v_i(t) \quad \text{(Eq. 7)}$$

$$\dot{v}_i(t) = -a_{ij}k_{ij}\cdot\Big[\Big(r_i(t)-r_j(t-\tau_{ij}(t))+l_j+v_i(t)\cdot\big(t^g_{ij}(t)+\tau_{ij}(t)\big)\Big)+ \gamma_i\cdot\big(v_i(t)-v_j(t-\tau_{ij}(t))\big)\Big],\ i,\ j\in\mathcal{H} \quad \text{(Eq. 8)}$$

where $\tau_{ij}(t)$ denotes the time-variant actuation delay. In example embodiments, $$t^g_{ij}(t)$$

represents the driver-preferred time-variant time gap between the ego vehicle i and the lead vehicle j, whose value is correlated to the driver-preferred following gap, which is determined based on the learned relationship 706.

In example embodiments, the output of the P-ACC longitudinal control algorithm 708, i.e., the target acceleration 710 given by $\dot{v}_i(t)$ may be inputted to a P-ACC controller 712 (which may form part of the P-ACC system 200) to change the vehicle dynamics of the ego vehicle i along the longitudinal axis to accelerate the vehicle to the target acceleration 710 and achieve the desired following gap given the current speed of vehicle j. Once the desired following gap is reached, vehicle i may be maintained at constant speed to maintained the following gap (as long as the speed of vehicle j does not change).

In some embodiments, the value of $$t^g_{ij}(t)$$

may be incrementally updated as new vehicle data 330 is obtained as a result of additional manual interventions (overwrite and/or takeover events) that occur. That is, as additional manual interventions occur, new periods of steady-state operation of the vehicle i also occur between the manual interventions, and new vehicle data 330 reflective of these new periods of steady-state operation may be fed back into a preferred P-ACC driving pattern learning model 704 to incrementally refine the model and adjust the learned relationship 706 between the driver-preferred following gap and car-following vehicle dynamics.

The gap profile recommender engine can use a variety of different machine learning (ML) models. For example, the gap profile recommender engine can use a K-nearest neighbor algorithm, a singular value decomposition algorithm, and/or a deep neural network algorithm. For example, the K-nearest neighbor algorithm is a non-parametric, supervised learning classifier, which uses proximity to make classifications or predictions about the grouping of an individual data point. Thus, the algorithm stores all the available cases and classifies the new data or case based on a similarity measure.

In addition, singular value decomposition (SVD) is a matrix factorization technique that when implemented in a ML method transforms data to a specified category that can be easily distinguished. SVD involves decomposing a matrix into a product of two square matrix, and a diagonal matrix. SVD is often used to get a low-rank approximation of a matrix. For example, a ML method can find the highest number of k elements of the diagonal matrix and drop all other columns and rows. If the k value is large enough, the ML method will get a very close approximation to the original data.

For example, in one embodiment the recommender engine is implemented using a content based filtering model comprising a nearest neighbor model and a deep neural network model. In another embodiment, the recommender engine is implemented using a collaborative filtering model comprising the nearest neighbor algorithm and the single value decomposition algorithm. In yet another embodiment, the recommender engine is implemented using a hybrid model comprising the singular value decomposition model.

A deep neural network is typically represented as a hierarchical (i.e., layered) organization of neurons with connections to other neurons. Each neuron passes a signal to another neuron based on the received input. The net of different signal paths creates a complex network. Most deep neural networks also include a feedback mechanism that uses to the output of the deep neural network to adjust one or more decision making parameters.

Each ML model is fed a set of parameters to determine the following distance of the vehicle relative to the lead vehicle. The set of parameters includes a trip score, weather data, and people data. The trip score includes a fuel consumption score, an acceleration score, a breaking score, and a driving score. The weather data includes rain, snow, clouds, visibility, current time, sunset time, and sunrise time. The people data includes data pertaining to the number of people in the cabin, and the type of people in the cabin. For example, the people data can include whether the driver is alone, or with a spouse, with family, with friends, with parent/in-laws, or with colleagues.

FIGS. 8A-8B are example illustrations of an P-ACC menu 802 included in an automotive user interface (UIs) 800, through which the preferred ACC mode may be operated by a user, according to one embodiment. The P-ACC menu 802 includes a weather setting 805, a passenger setting 810, and an individual setting 805. The weather setting 805 further includes a first plurality of ACC operation modes. The plurality of ACC operation modes include a sunny mode 805A, a cloudy mode 805B, a rainy mode 805C, and a snowy mode 805D. The passenger setting 810 includes a second plurality of ACC operation modes. The second plurality of ACC operation modes include a spouse mode 810A, a family mode 810B, and an in-law mode 810C. The individual setting includes a third plurality of ACC operation modes. The third plurality of ACC operation modes includes a mood mode 815A, and an adventure mode 815B. The mood mode 815A can include one or more individual moods (e.g., a cautious mood, an aggressive mood, etc.). Thus, when activating the mood mode 815A, the driver further selects an individual mood from the one or more moods.

A driver can select a particular setting as shown in the figure below. For example, on a sunny day, a driver may choose to set the preferred P-ACC mode of operation to sunny weather. A driver will typically select a preferred P-ACC mode of operation similar to the driver's manual style of driving.

A mode each of the plurality of ACC operation modes can each be engaged simultaneously. For example, a sunny mode, a spouse mode, and a mood mode can be activated simultaneously. When one or more modes are activated simultaneously, the P-ACC system aggregates one or more parameters for each mode of ACC operation.

For example, if a driver is travelling with family, he/she can select a family mode. If the driver feels adventurous, the driver can select an adventure mode. Further the menu 702 includes a new setting, where the driver can create a new mode not previously mentioned. The new mode can include one or more modes. For example, the new mode can include a family mode on a sunny day.

In one embodiment, the predictive model 400 uses a recommendation engine to make recommendations for a preferred P-ACC mode of operation where personalization is more complex (e.g., vehicle data 330 includes external data 350 such as sunny weather, and internal data 340 includes family members present in the vehicle). In another example, personalization preferences of the driver may not be known. In this scenario, given that there is no historical data of "sunny weather with family", the recommender engine estimates a new model and offers that as a personalization P-ACC setting. The recommender system uses collaborative filtering techniques to predict a user's historical behavior. The collaborative filtering technique applies a user's historical preference to a set of items. Because collaborative filtering is based on historical data, the recommender system uses a core assumption that a user's past decisions on a set of parameters should be applied to future decisions based on the same or similar sets of parameters.

The example architecture includes a gap profile recommender system that suggest a gap profile to the driver by analyzing the driver's current trip scores (e.g., fuel consumption score, acceleration score, breaking score, and driving score), and weather data (e.g., rain, snow, cloud, visibility, time, sunset time, and sunrise time). The gap profile is automatically suggests to the P-ACC system the most suitable profile by calculating the highest similarity trip score amongst other drivers.

Figure 9:
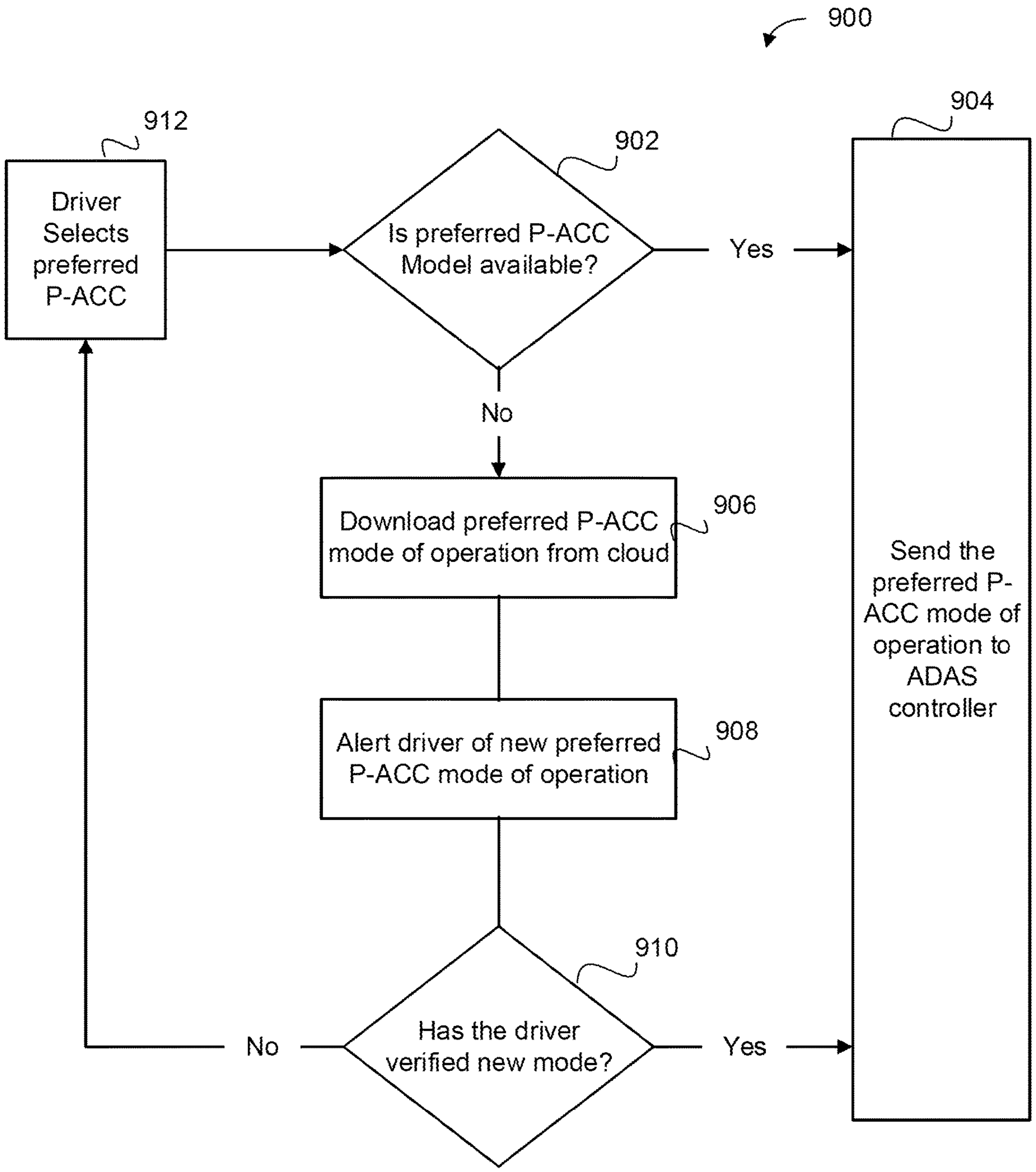
FIG. 9 illustrates an example method of selecting and storing a preferred P-ACC mode of operation for each driver of a vehicle.

FIG. 9 illustrates an example method of selecting and storing a preferred P-ACC mode of operation for each driver of a vehicle. The method 900 includes determining whether a preferred P-ACC mode of operation is available. If the preferred P-ACC mode of operation is available on the menu 801, then the selected P-ACC mode of operation is sent to an ADAS controller. If the preferred P-ACC mode of operation is not available on the menu 801 then the preferred P-ACC mode of operation is downloaded from the cloud. Once the download is complete, the driver is notified on a new model. If the driver has previously verified the preferred P-ACC mode of operation, then the downloaded preferred P-ACC mode of operation is sent to the ADAS controller. If the driver has not previously verified the preferred P-ACC mode of operation, then the preferred P-ACC mode of operation is presented to the driver via menu 801 on GUI 800. Once the driver verifies the P-ACC mode of operation, the verified P-ACC mode of operation is sent to the ADAS controller.

At activity 902, the method 900 includes determining whether a preferred P-ACC mode of operation is available. Each preferred P-ACC mode of operation previously download to menu 801 is presented to the driver. If the driver determines that he/she would like to operate the vehicle in a preferred P-ACC mode of operation currently represented via one or more menu options, then the driver desired P-ACC mode of operation is sent to the ADAS controller at activity 904. If the driver determines that he/she would like to operate the vehicle in a preferred P-ACC mode of operation not represented via one or more menu options, then the preferred P-ACC system downloads one or more preferred P-ACC modes of operation from cloud servers 203 at activity 906.

At activity 906, the method 900 includes downloading a preferred P-ACC mode of operation. Here, the preferred P-ACC mode of operation can be downloaded from a remote cloud server (e.g., the one or more cloud servers of 302). By downloading the preferred P-ACC mode of operation from a remote cloud server, the preferred P-ACC system can distribute learned patterns, based on the vehicle data 330, in the predictive model between multiple vehicles. The distributed learned patterns can be further revised by each vehicle and subsequently stored in the remote cloud server. In this way, the preferred P-ACC system can continuously learn driver preferences in various scenarios. For example, the system can be trained by a first driver in a first vehicle who desires a first preferred P-ACC mode of operation on a sunny day with three family members present in the vehicle as passengers, and by a second driver in a second vehicle who desires a second preferred P-ACC mode of operation on the same sunny day with three family members present in the vehicle as passengers.

At activity 908 the method includes notifying the driver that the new preferred P-ACC mode of operation is downloaded. The driver can be notified on the new preferred P-ACC mode of operation via any means of driver notification. For example, in one embodiment, the preferred P-ACC mode of operation notifies the driver via a notification window on a UI 800. In an alternative embodiment, the driver is notified via a heads-up display. In yet another embodiment, the driver is notified via the dashboard. Once the driver is notified on the new preferred P-ACC mode of the operation, the driver can verify the new mode.

At activity 910, the method 900 includes verifying the new preferred P-ACC mode of operation. If the driver verifies (i.e., agrees) that the preferred P-ACC mode of operation is his/her desired mode of operation, the method 900 includes progressing to activity 904 (i.e., sending the preferred P-ACC mode of operation to ADAS controller. If the driver does not verifies that the preferred P-ACC mode of operation is his/her desired mode of operation, then the method includes progressing to activity 912. At activity 912, the method 900 include selecting the preferred P-ACC mode of operation. In one embodiment, the driver selects the preferred P-ACC mode of operation by using the menu 801. Once the driver selects the preferred P-ACC mode of operation, the P-ACC mode of operation is adjusted to incorporated the preferences of the preferred P-ACC mode of operation. In one embodiment, the driver preferences include gap preferences and braking preferences. In an alternative embodiment, the driver preferences include acceleration and deceleration preferences.

Figure 10:
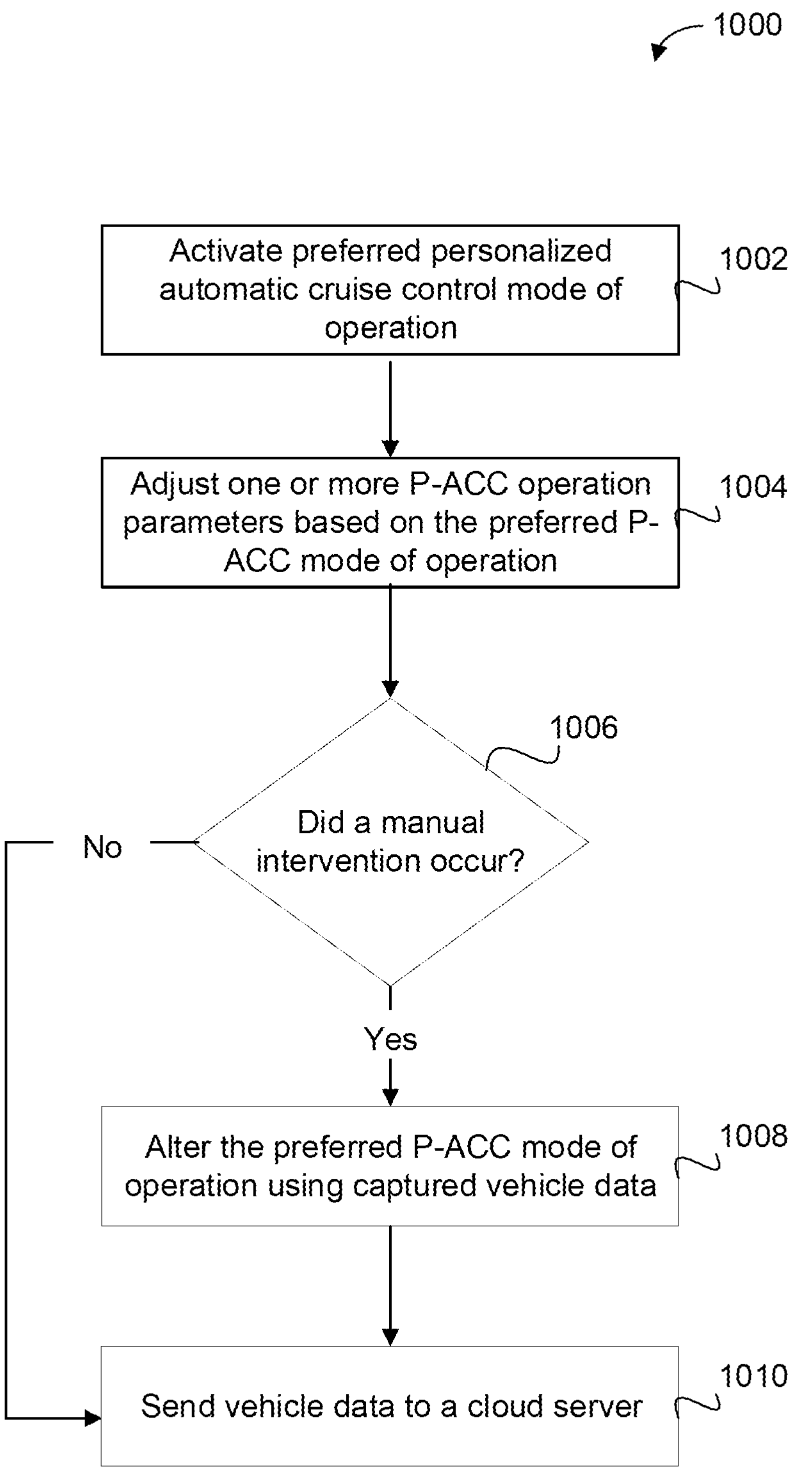
FIG. 10 illustrates an example method of a preferred P-ACC mode of operation, according to one embodiment.

FIG. 10 illustrates an example method of a preferred P-ACC mode of operation, according to one embodiment. The method 1000 includes activating a preferred personalized automatic cruise control (P-ACC) mode of operation of a vehicle (e.g., vehicle 2). In one embodiment, the mode of operation is activated via the driver selecting one or more preferred P-ACC settings in menu 801. Once the preferred P-ACC mode of operation is activated by the driver, the preferred P-ACC system 200 adjusts one or more operation parameters (e.g., gap preference, acceleration preference, braking preference, etc.) based on the preferred mode of operation. If the driver attempts to intervene (i.e., a manual intervention) to adjust one or more operation parameters of preferred P-ACC mode of operation, the system will alter the preferred P-ACC mode of operation according to the driver's intents and send vehicle data 330 associated with the driver's actions to one or more cloud servers 302 for storing. Once received by the cloud servers 302, the vehicle data can be used to train the predictive model 400 used to operate the preferred P-ACC system 200 (i.e., adjust the P-ACC mode of operation).

At activity 1002, the method 1000 includes activating the preferred P-ACC. Each preferred P-ACC mode of operation previously download to menu 801 is presented to the driver. If the driver determines that he/she would like to operate the vehicle in a preferred P-ACC mode of operation currently represented via one or more menu options, then the driver desired P-ACC mode of operation is sent to the ADAS controller.

At activity 1004, the method 1000 includes adjusting one or more P-ACC operation parameters based on the preferred P-ACC mode of operation. Once the preferred P-ACC mode of operation is activated by the driver, the preferred P-ACC system 200 adjusts one or more operation parameters (e.g., gap preference, acceleration preference, braking preference, etc.) based on the preferred mode of operation. If at activity 1006, the driver attempts to adjust the preferred P-ACC mode of operation, the preferred P-ACC system will progress to activity 1008 to alter the preferred P-ACC mode of operation according to the driver's intent. If the driver attempts to intervene (i.e., a manual intervention) to adjust one or more operation parameters of preferred P-ACC mode of operation, the system will alter the preferred P-ACC mode of operation according to the driver's intents and send vehicle data 330 associated with the driver's actions to one or more cloud servers 302 for storing. Once received by the cloud servers 302, the vehicle data can be used to train the predictive model 400 used to adjust the preferred P-ACC mode of operation.

The manual intervention 516 may be a driver's engagement of a braking mechanism of the vehicle 502 (e.g., depressing a brake pedal). The driver of vehicle 502 may perform the manual intervention 516 if, for example, he/she is uncomfortable with the following gap being maintained according to the initial control strategy and seeks to increase the following gap. The preferred P-ACC system 200 may transition to a deactivated state responsive to the manual intervention 516, and may require manual reactivation. Although the P-ACC system 200 may be in a deactivated state, vehicle data 330 can continue to be captured by sensors 252 and vehicle systems 258. For example, subsequent to the manual intervention 516, the driver of vehicle 502 may manually operate the vehicle—which may include any number of additional engagements of the accelerator and/or braking mechanisms of the vehicle 502—until a desired following gap is achieved, at which point, the driver may reactivate 310 the P-ACC system 200. Throughout this example manual intervention 516 vehicle data 330 can continue to be captured.

In an alternative embodiment, the driver's manual intervention may include adjusting one or more preferred P-ACC mode of operation parameters via the UI 800. For example, the driver may desire to increase the gap distance between the vehicle 2 (i.e., following vehicle 502) and the lead vehicle 504, by activating the gap preference button 835 in menu 801. By activating the + or − setting on the gap preference button 835, the driver can manually intervene to adjust the preferred P-ACC mode of operation.

At activity 1008, the method 1000 includes altering the preferred P-ACC mode of operation using captured vehicle data. When the manual intervention is detected by the preferred P-ACC system, any vehicle dynamics data captured during preferred P-ACC operation can be stored and fetched by one or more machine learning models to update (e.g., continuously train) the preferred P-ACC mode of operation. The vehicle dynamics data can be used as ground-truth data for training a P-ACC driving pattern machine learning model. Thus the vehicle data 330 captured during the manual intervention can be used to train the preferred P-ACC system. The predictive model 400 can be continuously trained using vehicle data. For example, learned patterns, based on vehicle data, can be fed into the predictive model 400 to adjust the preferred P-ACC mode of operation.

At activity 1010, the method 1000 includes sending vehicle data to a cloud server. Vehicle data 330 can be captured throughout various times of vehicle operation. For example, in one embodiment, vehicle data 330 can be captured during a manual intervention that occurs during preferred P-ACC operation. The captured vehicle data 330 is sent to and received by one or more cloud servers 203. The one or more cloud servers 203 include preferred P-ACC control logic 305 configured to learn (i.e., determine) patterns from the vehicle data 330. The learned patterns can be stored as distributed learned patterns in a remote cloud server (e.g., cloud server 302) and can be used to alter other preferred P-ACC modes of operation. The other preferred P-ACC mode of operation can include other P-ACC modes of operation on the same vehicle, or other vehicles not driven by the driver of the manual interference. For example, the preferred P-ACC system 200 can be trained by a first driver in a first vehicle who desires a first P-ACC operation parameter (e.g., a first gap preference) on a rainy day, and by a second driver in a second vehicle who desires a second P-ACC operation parameter (e.g., a second gap preference) on a rainy day. By fetching the distributed learned patterns on the cloud server 302 other preferred P-ACC systems 200 can be continuously trained in addition to the driver's preferred P-ACC system 200.

Figure 11:
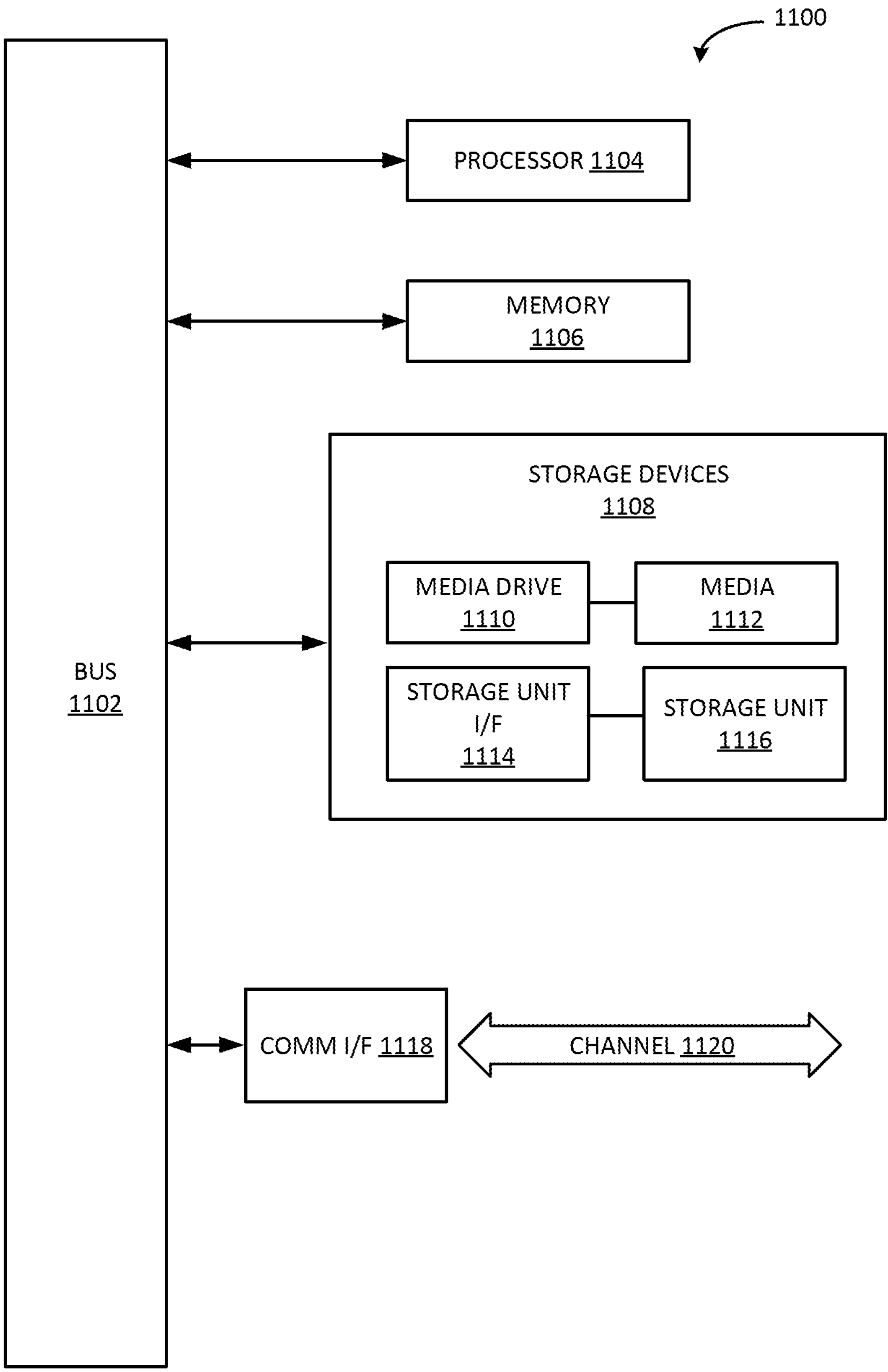
FIG. 11 is an example computing component that may be used to implement various features of embodiments of disclosed technology of the disclosed technology.

As used herein, the terms circuit and component might describe a given unit of functionality that can be performed in accordance with one or more embodiments of the disclosed technology. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 11. After reading this description, it will become apparent to a person skilled in the relevant art how to implement the application using other computing components or architectures.

Referring now to FIG. 11, computing component 1100 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1100 might also represent computing capabilities embedded within or otherwise available to a given device. For example, a computing component might be found in other electronic devices such as, for example, portable computing devices, and other electronic devices that might include some form of processing capability.

Computing component 1100 might include, for example, one or more processors, controllers, control components, or other processing devices. This can include a processor 1104, the processor (e.g., processor 206 and/or processor 306), or the like. Processor 1104 might be implemented using a general-purpose or special-purpose processing engine such as, for example, a microprocessor, controller, or other control logic. Processor 1104 may be connected to a bus 1102. However, any communication medium can be used to facilitate interaction with other components of computing component 1100 or to communicate externally.

Computing component 1100 might also include one or more memory components, simply referred to herein as main memory 1106, which may, in example embodiments, include memory 208 or memory 308. For example, random access memory (RAM) or other dynamic memory, might be used for storing information and instructions to be executed by processor 1104. Main memory 1106 might also be used for storing temporary variables or other intermediate information during execution of instructions to be executed by processor 1104. Computing component 1100 might likewise include a read only memory ("ROM") or other static storage device coupled to bus 1102 for storing static information and instructions for processor 1104.

The computing component 1100 might also include one or more various forms of information storage, which might include, for example, a media drive 1110 and a storage unit interface 1114. The media drive 1110 might include a drive or other mechanism to support fixed or removable storage media 1112. For example, a hard disk drive, a solid-state drive, a magnetic tape drive, an optical drive, a compact disc (CD) or digital video disc (DVD) drive (R or RW), or other removable or fixed media drive might be provided. Storage media 1112 might include, for example, a hard disk, an integrated circuit assembly, magnetic tape, cartridge, optical disk, a CD or DVD. Storage media 1112 may be any other fixed or removable medium that is read by, written to or accessed by media drive 1110. As these examples illustrate, the storage media 1112 can include a computer usable storage medium having stored therein computer software or data.

In alternative embodiments, information storage mechanism (i.e., memory 1106) might include other similar instrumentalities for allowing computer programs or other instructions or data to be loaded into computing component 1100. Such instrumentalities might include, for example, a fixed or removable storage unit 1116 and an interface 1114. Examples of such storage units 1116 and interfaces 1114 can include a program cartridge and cartridge interface, a removable memory (for example, a flash memory or other removable memory component) and memory slot. Other examples may include a PCMCIA slot and card, and other fixed or removable storage units 1116 and interfaces 1114 that allow software and data to be transferred from storage unit 1116 to computing component 1100.

Computing component 1100 might also include a communications interface 1118. Communications interface 1118 might be used to allow software and data to be transferred between computing component 1100 and external devices. Examples of communications interface 1118 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1118 may be carried on signals, which can be electronic, electromagnetic (which includes optical) or other signals capable of being exchanged by a given communications interface 1118. These signals might be provided to communications interface 1118 via a channel 1120. Channel 1120 might carry signals and might be implemented using a wired or wireless communication medium. Some examples of a channel 1120 might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1106, storage unit 1116, media 1112, and channel 1120. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1100 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:

at least one processor configured to execute machine-executable instructions to:

capture in-cabin data of a vehicle to determine a first set of one or more passengers are present in the vehicle;

responsive to determining the first set of one or more passengers are present in the vehicle, capture one or more manual interventions by a driver of the vehicle during operation of personalized adaptive cruise control (P-ACC) in the vehicle when the first set of one or more passengers are present in the vehicle;

capture traffic conditions data when the first set of one or more passengers are present in the vehicle, wherein the traffic conditions data comprises proximity data of surrounding vehicles to the vehicle;

based on the captured one or more manual interventions, learn a first P-ACC preference of the driver associated with presence of the first set of one or more passengers in the vehicle; and adjust one or more operational parameters of the P-ACC based on the learned first P-ACC preference of the driver, wherein adjusting the one or more operational parameters of the P-ACC is further based on the captured traffic conditions data.

2. The system of claim 1, wherein the in-cabin data indicates at least one of:

a number of passengers in the first set of one or more passengers, or a type of passenger for each of the one or more passengers in the first set of one or more passengers.

3. The system of claim 2, wherein the type of passenger for a respective passenger in the first set of one or more passengers is determined by a classifier configured to determine family or social relationships among passengers.

4. The system of claim 1, wherein the adjusted one or more operational parameters of the P-ACC include:

a preferred following distance for the vehicle behind a lead vehicle when the first set of one or more passengers are present the vehicle;

a braking preference for the vehicle when following the lead vehicle when the first set of one or more passengers are present the vehicle; and an acceleration preference for the vehicle when following the lead vehicle when first the set of one or more passengers are present the vehicle.

5. The system of claim 1, wherein the at least one processor is further configured to execute machine-executable instructions to:

capture second in-cabin data of a vehicle to determine a second set of one or more passengers are present in the vehicle;

responsive to determining the second set of one or more passengers are present in the vehicle, capture one or more manual interventions by a driver of the vehicle during operation of the P-ACC when the second set of one or more passengers are present in the vehicle; and based on the captured one or more manual interventions when the second set of one or more passengers are present in the vehicle, learn a second P-ACC preference of the driver associated with presence of the second set of one or more passengers in the vehicle;

wherein, adjusting the operational parameters of the P-ACC is further based on the learned second P-ACC preference of the driver.

6. The system of claim 5, wherein:

learning the first P-ACC preference of the driver associated with presence of the first set of one or more passengers in the vehicle comprises training, based on the captured one or more manual interventions when the first set of one or more passengers are present in the vehicle, a first machine learning model to adjust operational parameters of a first mode of operation for the P-ACC; and learning the second P-ACC preference of the driver associated with presence of the second set of one or more passengers in the vehicle comprises training, based on the one or more manual interventions when the second set of one or more passengers are present in the vehicle, a second machine learning model to adjust operational parameters of a second mode of operation for the P-ACC.

7. The system of claim 6, wherein the at least one processor is further configured to execute machine-executable instructions to:

implement the first mode of operation for the P-ACC responsive to determining the set of one or more passengers are present in the vehicle; and implement the second mode of operation for the P-ACC responsive to determining the second set of one or more passengers are present in the vehicle.

* * * * *